United States Patent
Grayson et al.

(10) Patent No.: US 12,495,985 B2
(45) Date of Patent: Dec. 16, 2025

(54) OPTIMIZED ELECTRICAL IMPEDANCE TOMOGRAPHY

(71) Applicant: Northwestern University, Evanston, IL (US)

(72) Inventors: Matthew Allen Grayson, Evanston, IL (US); Chulin Wang, Evanston, IL (US); Claire Cecelia Onsager, Stoughton, WI (US); Can Cenap Aygen, Chicago, IL (US); Charles M. Costakis, Evanston, IL (US); Lauren E. Lang, Boulder, CO (US); Andreas Tzavelis, Demarest, NJ (US); John Ashley Rogers, Wilmette, IL (US); Suzan van der Lee, Evanston, IL (US)

(73) Assignee: Northwestern University, Evanston, IL (US)

( * ) Notice: Subject to any disclaimer, the term of this patent is extended or adjusted under 35 U.S.C. 154(b) by 381 days.

(21) Appl. No.: 18/049,551

(22) Filed: Oct. 25, 2022

(65) Prior Publication Data

US 2023/0081541 A1 Mar. 16, 2023

Related U.S. Application Data

(63) Continuation-in-part of application No. 17/295,318, filed as application No. PCT/US2019/063846 on Nov. 29, 2019, now Pat. No. 12,357,188.
(Continued)

(51) Int. Cl.
*G06T 11/00* (2006.01)
*A61B 5/0536* (2021.01)

(52) U.S. Cl.
CPC .......... *A61B 5/0536* (2013.01); *G06T 11/003* (2013.01)

(58) Field of Classification Search
None
See application file for complete search history.

(56) References Cited

U.S. PATENT DOCUMENTS

| | | | |
|---|---|---|---|
| 9,535,025 B2 | 1/2017 | Grayson et al. | |
| 10,215,796 B2 | 2/2019 | Grayson et al. | |
| (Continued) | | | |

OTHER PUBLICATIONS

D. Silvera-Tawil, D. Rye, M. Soleimani and M. Velonaki, "Electrical Impedance Tomography for Artificial Sensitive Robotic Skin: A Review," in IEEE Sensors Journal, vol. 15, No. 4, pp. 2001-2016. (Year: 2015).*

(Continued)

*Primary Examiner* — David Ometz
(74) *Attorney, Agent, or Firm* — Benesch Friedlander Coplan & Aronoff LLP

(57) ABSTRACT

The disclosed 2-D resistance tomographic imaging method optimizes computation speed for performing electrical impedance tomography using a model-space with a minimal number of orthonormal polynomial basis functions to describe discernable features in the 2-D resistance tomographic image, determining a minimal number of contacts to take fewer measurements than available information based on the number of basis functions, selecting a subset of rows of a matrix of calculated sensitivity coefficients to form a square Jacobian matrix for a linearized forward problem to be solved and inversion of the linear forward problem, and solving an inverse problem based on the square Jacobian matrix by performing at least one iteration of a Newton's method solve.

20 Claims, 11 Drawing Sheets

Related U.S. Application Data

(60) Provisional application No. 63/273,080, filed on Oct. 28, 2021, provisional application No. 62/772,369, filed on Nov. 28, 2018.

(56) References Cited

U.S. PATENT DOCUMENTS

| | | |
|---|---|---|
| 10,444,187 B2 | 10/2019 | Grayson et al. |
| 10,529,674 B2 | 1/2020 | Grayson et al. |
| 2017/0241847 A1 | 8/2017 | Loh |

OTHER PUBLICATIONS

Onsager, Claire, et al. "Sensitivity analysis for optimizing electrical impedance tomography protocols." arXiv preprint arXiv: 2111.01397. (Year: 2021).*
Adler, A. et al., "Uses and abuses of EIDORS: an extensible software base for EIT," Physiol. Meas. 27 (2006) S25-S42; doi:10.1088/0967-3334/27/5/S03 (19 pages).
Agrawal, A. et al., "Tangible Play Surface Using Passive RFID Sensor Array," CHI'18 Extended Abstracts, Apr. 21-26, 2018, Montreal, QC, Canada, https://doi.org/10.1145/3170427.3186514 (4 pages).
Alshurafa, N. et al., "Personalized Medicine in the Wearable Area: Translational Barriers and Call to Action," HumanSys'17, Nov. 5, 2017, Delft, The Netherlands, https://doi.org/10.1145/3144730,3144738 (6 pages).
Barber, D.C. et al., "Applied potential tomography," 1984 J. Phys. E: Sci. Instrum. 17, pp. 723-733 (12 pages).
Boateng, G. et al., "ActivityAware: An App for Real-Time Daily Activity Level Monitoring on the Amulet Wrist-Worn Device," Second IEEE PerCom Workshop on Pervasive Health Technologies 2017 (5 pages).
Boateng, G. et al., "GeriActive: Wearable App for Monitoring and Encouraging Physical Activity among Older Adults," 2018 IEEE 15th International Conference on Wearable and Implantable Body Sensor Networks (BSN), Mar. 4-7, 2018, Las Vegas, NV, USA (4 pages).
Cui, B. et al., "Introducing Fourier-domain mobility spectrum analysis (FMSA) to deduce multi-component carrier mobility and density," Proc. SPIE 9370, Quantum Sensing and Nanophotonic Devices XII, 937030, Feb. 8, 2015, doi: 10.1117/12.2179825 (9 pages).
Cui, B. et al., "Background subtraction in Fourier-domain mobility spectrum analysis for resolving low-mobility carriers," Proc. SPIE 10111, Quantum Sensing and Nanophotonic Devices XIV, 101110N, Jan. 27, 2017, doi: 10.1117/12.2256345 (8 pages).
Dai, L., "Carbon Nanotube Rubber Stays Rubbery in Extreme Temperatures," Angew. Chem. Int. Ed. 2011, 50, pp. 4744-4746, doi:10.1022/anie.201100414 (3 pages).
Dasgupta, S. et al., "Single-valley high-mobility (110) AlAs quantum wells with anisotropic mass," Appl. Phys. Lett. 93, 132102 (2008), https://doi.org/10.1063/1.2991448 (4 pages).
Easley, J. et al., "Analysis of Carrier Transport in n-type Hg1-xCdxTe with Ultra-Low Doping Concentration," Journal of Electronic Materials, vol. 47, No. 10, 2018, pp. 5699-5704 (6 pages).
Freidman, D.P., "Public Outreach: A Scientific Imperative," The Journal of Neuroscience, Nov. 12, 2008, 28 (46), pp. 11743-11745 (3 pages).
Grayson, G., "Viewpoint: Quasiparticle doppelgangers," Physics 2, 56 (2009), doi:10.1103/Physics.2.56 (3 pages).
Groeger, D. et al., "ObjectSkin: Augmenting Everyday Objects with Hydroprinted Touch Sensors and Displays," Proceedings of the ACM on Interactive, Mobile, Wearable and Ubiquitous Technologies, vol. 1, No. 4, Article 134, Dec. 2017 (23 pages).
Hardin, T. et al., "Application Memory Isolation on Ultra-Low-Power MCUs," 2018 USENIX Annual Technical Conference, Jul. 11-13, 2008, Boston, MA, pp. 127-132, ISBN 978-1-939133-02-1 (7 pages).

Henderson, R.P. et al., "An Impedance Camera for Spatially Specific Measurements of the Thorax," IEEE Transactions on Biomedical Engineering, vol. BME-25, No. 3, May 1978, pp. 250-254 (5 pages).
Herzog, F. et al., "Optimization of AlAs/AlGaAs quantum well heterostructures on on-axis and misoriented GaAs (111)B," Appl. Phys. Lett. 100, 192106 (2012), https://doi.org/10.1063/1.4711783 (6 pages).
Hester, J. et al., "Tragedy of the Coulombs: Federating Energy Storage for Tiny, Intermittently-Powered Sensors," SenSys'15, Nov. 1-4, 2015, Seoul, South Korean, doi:http://dx.doi.org/10.1145/2809695.2809707 (12 pages).
Hester, J. et al., "Amulet: An Energy-Efficient, Multi-Application Wearable Platform," SenSys'16, Nov. 14-16, 2016, Stanford, CA, USA, doi:http://dx.doi.org/10.1145/2994551.2994554 (14 pages).
Hester, J. et al., "Flicker: Rapid Prototyping for the Batteryless Internet-of-Things," SenSys'17, Nov. 6-8, 2017, Delft, The Netherlands, https://doi.org/10.1145/3131672.3131674 (13 pages).
Huang, S.M. et al., "Capacitance-based tomographic flow imaging system," Electronics Letters, vol. 24, No. 7, 1988, pp. 418-419 (2 pages).
Hwang, S-H. et al., "Smart Materials and Structures Based on Carbon Nanotube Composites," InTech, Jul. 2011, pp. 371-396, ISBN: 978-953-307-497-9 (29 pages).
Irber, D.M. et al., "Quantum Transport and Sub-Band Structure of Modulation-Doped GaAs/AlAs Core-Superlattice Nanowires," Nano Lett. 2017, 17, pp. 4886-4893, doi: 10.2021/acs.nanolett.7b01732 (8 pages).
Jin, H. et al., "WiSh: Towards a Wireless Shape-aware World using Passive RFDs," MobiSys '18, Jun. 10-15, 2018, Munich, Germany, pp. 428-441, https:/doi.org/10.1145/3210240.3210328 (14 pages).
Kansal, A. et al., "Power Management in Energy Harvesting Sensor Networks," ACM Transactions on Embedded Computing Systems, vol. 6, No. 4, Article 32, Sep. 2007 (38 pages).
Lachman, N. et al., "Raman Response of Carbon Nanotube/PVA Fibers under Strain," J. Phys. Chem. C, vol. 113, No. 12, 2009, pp. 4751-4754 (4 pages).
Langer, R.E., "An Inverse Problem in Differential Equations," The University of Wisconsin, Oct. 1933, pp. 814-819 (7 pages).
Langer, R.E., "On the Determination of Earth Conductivity from Observed Surface Potentials," Earth Conductivity, 1936, pp. 747-754 (7 pages).
Lee, J. et al., "Impact of carbon nanotube length on electron transport in aligned carbon nanotube networks," Appl. Phys. Lett. 106, 053110, 2015, https://doi.org/10.1063/1.4907608 (6 pages).
Leong, J. et al., "proCover: Sensory Augmentation of Prosthetic Limbs Using Smart Textile Covers," UIST 2016, Oct. 16-19, 2016, Tokyo, Japan, pp. 335-346, doi:http://dx.doi.org/10,1145/2984511.2984572 (12 pages).
Leshner, A.I., "Outreach Training Needed," Science, vol. 315, Jan. 12, 2007, p. 161 (1 page).
Lionheart, W.R.B. et al., "Electrical Impedance and Diffuse Optical Tomography Reconstruction Software," 1st World Congress on Industrial Process Tomography, Buxton, Greater Manchester, Apr. 14-17, 1999, pp. 475-477 (5 pages).
Lorussi, F. et al., "Strain Sensing Fabric for Hand Posture and Gesture Monitoring," IEEE Transactions on Information Technology in Biomedicine, vol. 9, No. 3, Sep. 2005, pp. 372-381 (10 pages).
Luo, J. et al., "Transient photoresponse in amorphous In—Ga—Zn—O thin films under stretched exponential analysis," J. Appl. Phys. 113, 153709 (2013), https://doi.org/10.1063/1.4795845 (9 pages).
Luo, J., "Characterization and Modeling Transient Photoconductivity in Amorphous In—Ga—Zn—O Thin Films," Dec. 2016, (6 pages).
Luo, J. et al., "Generalized Fit for Asymptotic Predictions of Heavy-Tail Experimental Transients," arXiv:1706.00902v1, Jun. 3, 2017 (14 pages).
Mercader, C. et al., "Sensitivity of Carbon Nanotubes to the Storage of Stress in Polymers," Macromol. Rapid Commun. 2011, 32, pp. 1993-1997 (5 pages).

(56) References Cited

OTHER PUBLICATIONS

Mishra, V. et al., "Investigating Contextual Cues as Indicators for EMA Delivery," UbiComp/ISWC '17 Adjunct, Sep. 11-15, 2017, Maui, Hawaii, USA, pp. 935-940, doi:https://doi.org/10.1145/3123024.3124571 (6 pages).

Montroll, E.W., "Random Walks on Lattices," http://dx.doi.org/10.1090/psapm/016/0161378, accessed Jan. 31, 2023, pp. 193-220 (28 pages).

Montroll, E.W. et al., "Random Walks on Lattices.II," J. Math. Phys. 6, 167, 1965, https://doi.org/10.1063/1.1704269 (16 pages).

Natarajan, B. et al., "Aligned carbon nanotube morphogenesis predicts physical properties of their polymer nanocomposites," Nanoscale, 2019, 11, 16327 (10 pages).

Ngai, K.L. et al., "Dispersive diffusion transport and noise, time-dependent diffusion coefficient, generalized Einstein-Nernst relation, and dispersive diffusion-controlled unimolecular and bimolecular reactions," Physical Review B, vol. 24, No. 2, Jul. 15, 1981, pp. 1049-1064 (16 pages).

Ni, W. et al., "Fabrication and Properties of Carbon Nanotube and Poly(vinyl alcohol) Composites," Journal of Macromolecular Science, Part B: Physics, 45, pp. 659-664, 2006, doi:10.1080/00222340600770335 (7 pages).

Oh, J. et al., "Pressure Insensitive Strain Sensor with Facile Solution-Based Process for Tactile Sensing Applications," ACS Nano 2018, 12, pp. 7546-7553, doi:10.1021/acsnano.8b03488 (8 pages).

Peng, L. et al., "All-Electrical Determination of Crystal Orientation in Anisotropic Two-Dimensional Materials," Phys. Rev Lett. 120, 086801, 2018, doi:10.1103/PhysRevLett.120.086801 (5 pages).

Prabu-Gaunkar, S. et al., "Valley degeneracy in biaxially strained aluminum arsenide quantum wells," Physical Review B 84, 125319, 2011, doi:10.1103/PhysRevB.84.125319 (15 pages).

Raghunathan, V. et al., "Design Considerations for Solar Energy Harvesting Wireless Embedded Systems," 2005 IEEE, pp. 457-462 (6 pages).

Steinke, L. et al., "Hartree simulations of coupled quantum Hall edge states in corner-overgrown heterostructures," Physical Review B 87, 165428, 2013 (8 pages).

Tang, Y., et al., "Magnetotransport potentials for anisotropic thin films with stripline and ground plane contacts," Proc. SPIE 9370, Quantum Sensing and Nanophotonic Devices XII, 93700L, Feb. 8, 2015, doi:10.1117/12.2084489 (12 pages).

Vauhkonen, M. et al., "A MATLAB package for the EIDORS project to reconstruct two-dimensional EIT images," Physiol. Meas. 22, 2001, pp. 107-111 (6 pages).

Wang, L. et al., "Relation between repeated uniaxial compressive pressure and electrical resistance of carbon nanotube filled silicone rubber composite," Composites: Part A, 43, 2012, pp. 268-274 (7 pages).

Wang, L. et al., "Piezoresistive response to changes in contributive tunneling film network of carbon nanotube/silicone rubber composite under multi-load/unload," Sensors and Actuators A, 189, 2013, pp. 45-54 (10 pages).

Wang, L. et al., "Compressive relaxation of the stress and resistance for carbon nanotube filled silicone rubber composite," Composites: Part A, 47, 2013, pp. 63-71 (9 pages).

Wang, X. et al., "Room Temperature Resistive Volatile Organic Compound Sensing Materials Based on a Hybrid Structure of Vertically Aligned Carbon Nanotubes and Conformal oCVD/iCVD Polymer Coatings," ACS Sens. 2016, 1, pp. 374-383, doi:10.1021/acssensors.5b00208 (10 pages).

Wang, T. et al., "Plain2Fun: Augmenting Ordinary Objects with Interactive Functions by Auto-Fabricating Surface Painted Circuits," DIS '18, Jun. 9-13, 2018, Hong Kong, doi:https://doi.org.10.1145/3196709.3196791 (12 pages).

Windisch, T. et al., "De Haas-van Alphen effect and energy gaps of a correlated two-dimensional electron system in an AlAs two-valley pseudospin system," Physical Review B 80, 205306, 2009 (6 pages).

Yildirum, K.S. et al., "InK: Reactive Kernel for Tiny Batteryless Sensors," SenSys '18, Nov. 4-7, 2018, Shenzhen, China, pp. 41-53, https://doi.org/10.1145/3274783.3274837 (13 pages).

Yoon, S.H. et al., "iSoft: A Customizable Soft Sensor with Real-time Continuous Contact and Stretching Sensing," UIST 2017, Oct. 22-25, 2017, Quebec City, Canada, pp. 665-678 (14 pages).

Yoon, S.H. et al., "MultiSoft: Soft Sensor Enabling Real-Time Multimodal Sensing with Contact Localization and Deformation Classification," Proc. ACM Interact. Mob. Wearable Ubiquitous Technol., vol. 2, No. 3, Article 145, Sep. 2018 (21 pages).

Zernike, von F., "Beugungstheorie des Schneidenver-Fahrens Und Seiner Verbesserten Form, Der Phasenkontrastmethode," Physica, vol. 1, Issue 7, Apr. 30, 1934, pp. 689-704, doi:10.1016/S0031-8914(34)80259-5 (16 pages).

Zhang, Y. et al., "Electrick: Low-Cost Touch Sensing Using Electric Field Tomography," CHI 2017, May 6, 11, 2017, Denver, CO, USA (14 pages).

Zhou, C. et al., "Thermal conductivity tensors of the cladding and active layers of antimonide infrared lasers and detectors," Optical Materials Express, 1632, vol. 3, No. 10, Oct. 2013, doi:10.1364/OME.3.001632 (9 pages).

Zhou, W. et al., "Analyzing Longitudinal Magnetoresistance Assymmetry to Quantify Doping Gradients: Generalization of the van der Pauw Method," Physical Review Letters, 115, 186804, 2015 (5 pages).

Non-Final Office Action issued in U.S. Appl. No. 17/295,318, dated Sep. 9, 2024.

Kauppinen, P., et al., "Sensitivity distribution visualizations of impedance tomography measurement strategies," International Journal of Bioelectromagnetism 8.1 (2006):1-9.

Player, M. A., et al., "An electrical impedance tomography algorithm with well-defined spectral properties," Measurement Science and Technology 10.3 (1999): L9.

* cited by examiner

OPTIMIZED ELECTRICAL IMPEDANCE TOMOGRAPHY

CROSS-REFERENCE TO RELATED APPLICATIONS

This disclosure claims priority to and the benefit of U.S. Provisional Patent Application Ser. No. 63/273,080 titled "Optimized Electrical Impedance Tomography", filed on Oct. 28, 2021; U.S. Nonprovisional patent application Ser. No. 17/295,318 titled "High Resolution Two-Dimensional Resistance Tomography", filed on Nov. 29, 2019; and U.S. Provisional Patent Application Ser. No. 62/772,369 titled "High Resolution Two-Dimensional Resistance Tomography", filed on Nov. 28, 2018; all of which are incorporated by reference in their entirety.

STATEMENT OF FEDERALLY FUNDED RESEARCH OR SPONSORSHIP

This invention was made with government support under grant numbers DMR1729016 and 1912694 awarded by the National Science Foundation. The government has certain rights in the invention.

BACKGROUND OF THE DISCLOSURE

1. Technical Field

The present disclosure generally relates to tomography, and more specifically to electrical impedance tomography.

2. Related Art

Two-dimensional resistance tomography utilizes a resistive elastomer sensing membrane to produce a change in resistance when contact pressure is applied. Resistance change is measured through periphery contact electrodes to generate a tomographic image of low resolution. To increase the tomographic image resolution, a large number of periphery contact electrodes are required to generate a large amount of data that is needed to feed computation intensive mesh algorithms. The amount of data and computational complexity does not assure that the measurements will converge to a solution, which wastes computing resources. In short, traditional algorithms suffer from wasted resources or suffer from low resolution that comes with failing to provide the required amount of data due to reliance on an ill-defined mesh problem in the algorithm, to poorly placed contact electrodes and to non-optimal electrode measurement pairs.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

DETAILED DESCRIPTION

High Resolution Two-Dimensional Resistance Tomography

Figure 1A:
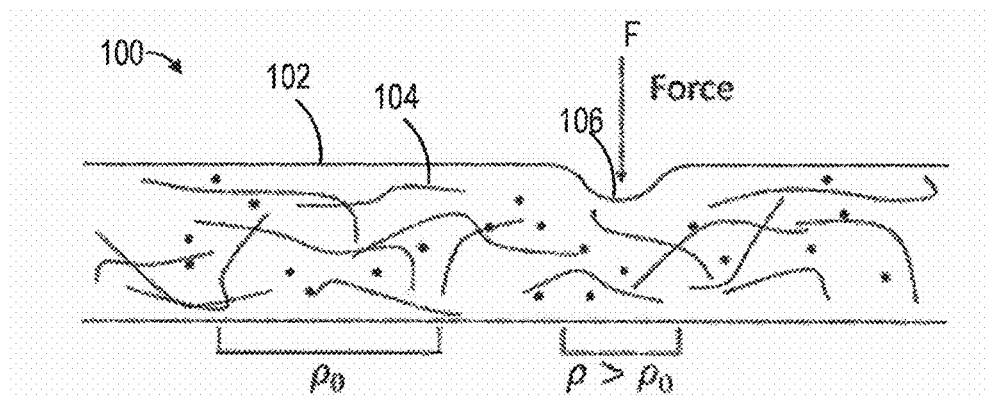
FIG. 1A is an exemplary resistive elastomer membrane and FIG. 1B is a pressure-sensitive demonstration of resistance change on the resistive elastomer membrane.
Figure 1B:
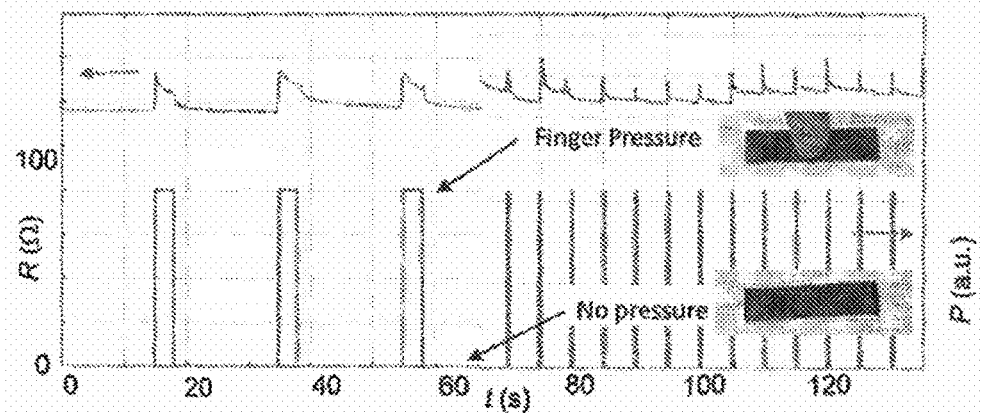

FIG. 1A is an exemplary resistive elastomer membrane 100 which is used in 2-D tomographic resistivity mapping. The resistive elastomer membrane 100 may be made of a composite of silicone elastomer 102 impregnated with pressure-sensitive carbon-nanotubes 104 having a resistivity of $\rho_0$. When a force F is applied to a surface area 106, the contact pressure causes a change in local resistivity, such as raising the local resistivity $\rho > \rho_0$ when the carbon-nanotubes 104 are compressed. FIG. 1B is a pressure-sensitive demonstration of resistance change on the resistive elastomer membrane.

Figure 2:
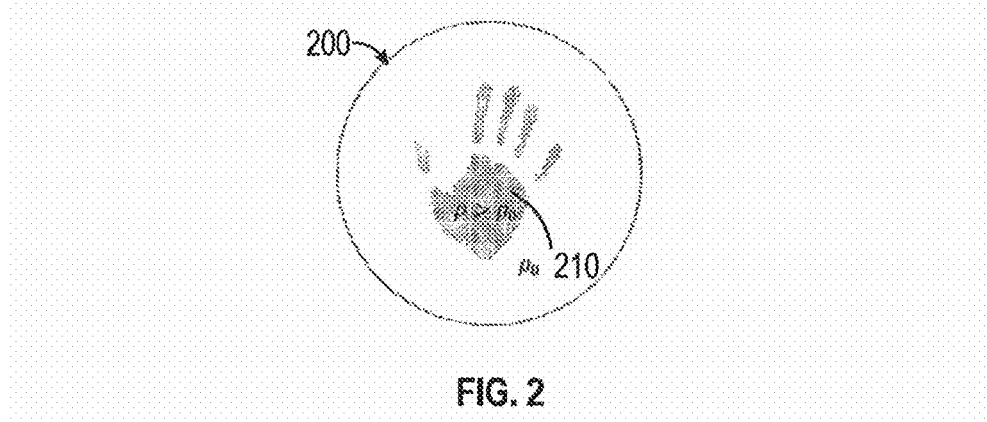
FIG. 2 is an exemplary tomographic resistivity map caused by resistivity change.

FIG. 2 is an exemplary tomographic resistivity map 210 on the resistive elastomer membrane 200 caused by a change in local resistivity $\rho > \rho_0$ due to contact pressure.

Figure 3A:
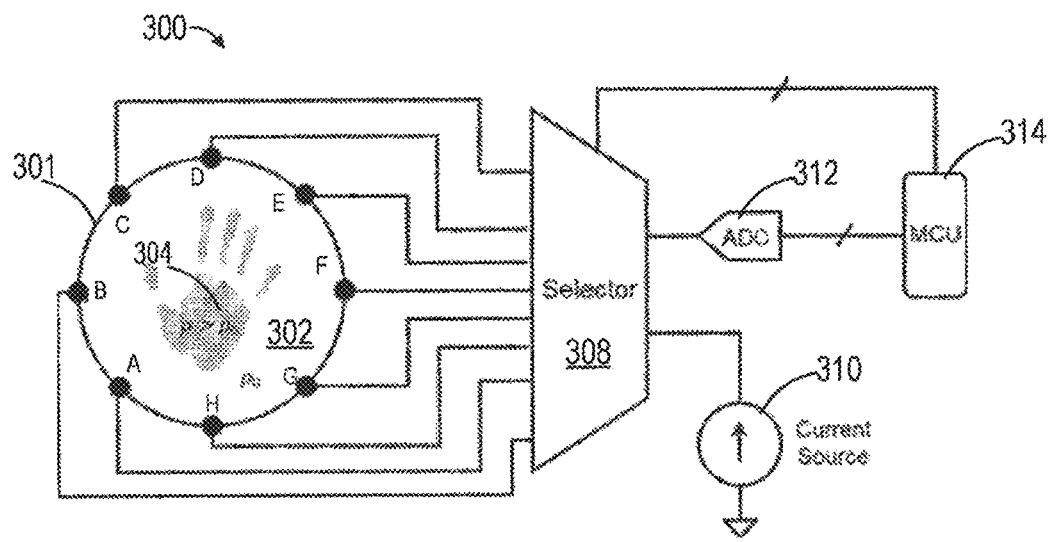
FIG. 3A illustrates an exemplary system to detect 2-D tomographic resistance image.

FIG. 3A illustrates an exemplary system 300 that detects a 2-D tomographic resistance image 304 on a resistivity map 302. In FIG. 3A, at least five electrode contacts (A to J) are attached along only periphery of the defined surface area 302 of the resistive sensing membrane 300. A resistance pattern caused by a contact pressure 304 is sensed by a combination of two contact electrode pairs (tetra-point) by simultaneously passing a current $I_{AB}$ 310 through a multiplexer 308 to the electrode pair AB rendering a voltage $V_{CD}$ at electrode pair CD.

The measured voltage $V_{CD}$ may be converted to digital format (e.g., digital data) through an analog to digital converter ADC 312. A respective tetra-polar resistance $(r_{ABCD})_i$ corresponding to a respective voltage and current ratio $(r_{ABCD})_i = V_{CD}/I_{AB}$ may be stored in a memory to be processed by a microcontroller MCU 314. Different electrode contact pairs such as EF and GH may also be simultaneously monitored as current leads and voltage probes until some or all N possible combination of electrode pairs are tested to measure the remaining tetra-polar resistances $(r_{ABCD})_i$ to $(r_{ABCD})_N$.

Accordingly, a 2-D tomographic image 304 over a surface 302 may be mapped by a computer implemented method by executing the following steps or operation. The first step defines a surface area 302 of a resistive sensing membrane 301 having Q periphery contact electrodes "A to H" that are attached along the periphery of the surface area of the resistive sensing membrane 301. In this step, Q is an integer (eight are illustrated in FIG. 3A) greater than or equal to five. A plurality of local area resistances $(r_{ABCD})_i$ to $(r_{ABCD})_N$ that vary with an applied contact pressure "F" over the defined surface area 302 of the resistive sensing membrane 301 causes a 2-D resistance variation.

The method further includes the step of mapping a 2-D resistance tomographic image 304 over the defined surface area 302 of the resistive sensing membrane 301. The mapping renders a plurality of local area resistance values $(r_{ABCD})_i$ to $(r_{ABCD})_N$ that reflect the applied contact pressure "F" to the surface area of the resistive sensing membrane.

The 2-D resistance tomographic image mapping further includes measuring the plurality of local area resistances $(r_{ABCD})_i$ to $(r_{ABCD})_N$ sequentially, over each and every N maximum combinations of two periphery contact electrode pairs from among the Q periphery contact electrodes "A to H". The result is a respective tetra-polar resistance $(r_{ABCD})_i$, wherein i=1 to N, and $$N = \frac{(Q-1)(Q-2)}{2},$$

wherein each respective tetra-polar resistance $(r_{ABCD})_i$ corresponds to a respective voltage and current ratio $(r_{ABCD})_i = V_{CD}/I_{AB}$, such that a respective voltage $V_{CD}$ is established across a first periphery contact electrode pair CD when a respective current $I_{AB}$ is simultaneously passed across a second periphery contact electrode pair AB. The first periphery contact electrode pair CD is different from the second periphery contact electrode pair AB, wherein the respective tetra-polar resistance $(r_{ABCD})_i$ reflects a local area resistance variation in a resistivity map $\rho(r)$ of the 2-D resistance tomographic image. The resistivity map $\rho(r)$ is related to the orthogonal basis polynomial functions $\phi_i(r)$ by $\rho(r) = \Sigma_i a_i \phi_i(r)$, and the resistivity map $\rho(r)$ is formed by superimposing the orthogonal basis polynomial functions $\phi_i(r)$. The orthogonal basis polynomial functions $\phi_i(r)$ have a resolution that increases with a degree of freedom set at an upper limit that is the same as the maximum combinations of N measurements. Here "a" is comprised of "a1, a2, . . . ai, . . . " that represent ordered vector coefficients. The 2-D resistance tomographic image is displayed through the resistivity map $\rho(r)$ on the defined surface 302.

Figure 3B:
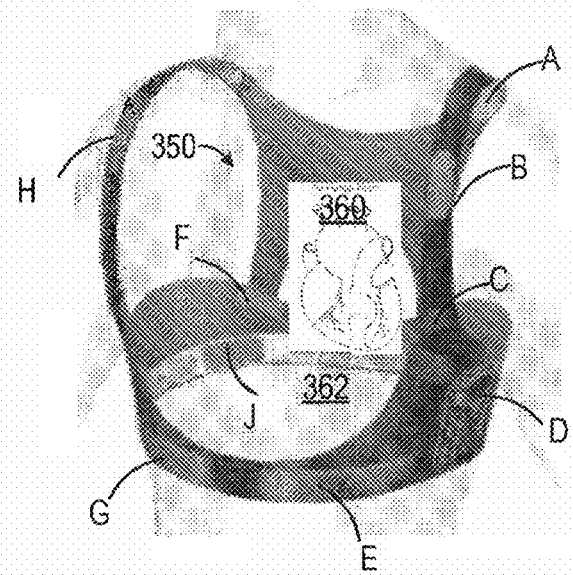
FIG. 3B illustrates an alternate detecting of a 3-D tomographic resistance image through volume resistance measurement.

FIG. 3B is an alternate detection of a 3-D tomographic resistance image 360 through a volume resistance measurement. In FIG. 3B, a 3-D tomographic resistance image 360 (such as an image of a human heart) may be sensed and detected through volume resistance measurements using a similar mapping algorithm and by a direct electrode placement over a defined volume boundary such as a human torso 350, for example, the human skin is a resistive membrane which encloses a resistive volume such as a human torso 350.

The computer implemented algorithm is modified to map a tomographic image 360 across a volume 350 beneath a surface 362. The method includes defining a resistive volume 350 having Q surface contact electrodes A to J attached on the defined surface area 362 of the resistive volume 350. Q is an integer, such as nine in this example (e.g., preferably greater than or equal to five), where a plurality of local volume resistances $(r_{ABCD})_i$ to $(r_{ABCD})_N$ are defined. The local volume resistances vary with depth and material compositions (e.g., the tissue types and densities) beneath the defined surface area 362 of the resistive volume 350. The variations cause a three-dimensional (3-D) resistance variation. The method further includes mapping a 3-D resistance tomographic image over the defined resistive volume 350 according to the plurality of local volume resistances $(r_{ABCD})_i$ to $(r_{ABCD})_N$ beneath the defined surface area 362 of the resistive volume 350.

The 3-D resistance tomographic image mapping further includes measuring the plurality of local volume resistances $(r_{ABCD})_i$ to $(r_{ABCD})_N$ sequentially, over each and every N maximum combinations of two periphery contact electrode pairs (e.g., AB, CD, etc.) from among the Q periphery contact electrodes A to J. The result is a respective tetra-polar resistance $(r_{ABCD})_I$ measure where i=1 to N, and $$N = \frac{(Q-1)(Q-2)}{2}.$$

Each of the respective tetra-polar resistance $(r_{ABCD})_i$ corresponds to a respective voltage and current ratio $(r_{ABCD})_i = V_{CD}/I_{AB}$. A respective voltage $V_{CD}$ is established across a first surface contact electrode pair CD when a respective current $I_{AB}$ is simultaneously passed between a second surface contact electrode pair AB. The first surface contact electrode pair CD is different from the second surface contact electrode pair AB. The respective tetra-polar resistance $(r_{ABCD})_i$ reflects a local volume resistance variation in a resistivity map $\rho(r)$ of the 3-D resistance tomographic image. The resistivity map $\rho(r)$ is related to orthogonal basis polynomial functions $\phi_i(r)$ that is part of the expression $\rho(r) = \Sigma_i a_i \phi_i(r)$. The resistivity map $\rho(r)$ is formed by superimposing the orthogonal basis polynomial functions $\phi_i(r)$. The map has a resolution that increases with a degree of freedom set at an upper limit same as the maximum combinations of N. The variable "a" is comprised of "a1, a2, . . . ai, . . . ", which are the ordered vector of coefficients. The detection displays the 3-D resistance tomographic image through the resistivity map $\rho(r)$ beneath the defined area 362.

The disclosed method improves tomographic resistance image resolution by adopting an orthogonal basis with a maximum number of elements N, which renders a maximum resolution resistivity map $\rho(r)$. The number of elements N is determined by the number of electrodes Q. The detection defines the orthogonal basis according to any known constraints in a problem, thereby enhancing the resolution where ever it is needed. The detection positions the electrodes such that they are sensitive to these basis functions. The selection of current I and voltage V contact electrode pairs maximize the signal-to-noise ratio output.

Some standard methods for electrical impedance tomography solve the inverse mapping problem by defining thousands of mesh points to represent a resistance map that is consistent with a much smaller set of measurements that is orders of magnitude smaller in size than the disclosed detection. As such, these finite-element methods present an ill-defined problem such that the number of variables to be solved greatly exceeds the number of equations required to constrain them. Under these conditions, a large amount of computational power is wasted on calculating an unnecessarily large number of mesh points, and the resulting solution is not unique, depending on the choice of mesh or other minor boundary conditions. Subsequently, a regularization procedure must be performed to include a cost-function in the solution to artificially induce smoothness in the final result.

More specifically, the disclosed 2-D and 3-D methods devise an alternate strategy for the inverse problem in electrical impedance tomography, which improves detection resolutions and reduces computational time. The 2-D and 3-D methods takes the following approaches:

(1) Set the number of orthogonal basis functions for the resistivity map N equal to the maximum number of independent resistance measurements, thereby guaranteeing a maximum resolution. If Q is the number of contacts, then the number of independent measurements Nis:

$$N = \frac{(Q-1)(Q-2)}{2} \quad (1)$$

The number basis functions may be restricted to the number of degrees of freedom, which make the solution unique, rather than ill-defined.

(2) Execute a set of orthogonal basis functions $\phi_i(r)$ to describe the resistivity map $\rho(r)$. Traditional tomographic methods may define a high-resolution mesh with thousands of points to describe the resistivity map. The mesh points are not independent of each other, as such they must be artificially correlated by adding an additional cost-function term in a regularization procedure. However, the disclosed approach executes an orthogonal basis functions $\phi_i(r)$ to describe the resistivity map $\rho(r)$. The resistivity map $\rho(r)$ may be described as an ordered vector of coefficients $a=(a_1, a_2, \ldots a_i, \ldots)$ that may be expressed by Eq. 2.

$$\rho(r) = \Sigma i\, a_i \phi_i(r) \quad (2)$$

Such basis functions may be proposed a priori from a set of orthogonal polynomials, or may be derived from a covariant analysis of a set of known resistivity maps.

Figure 4:
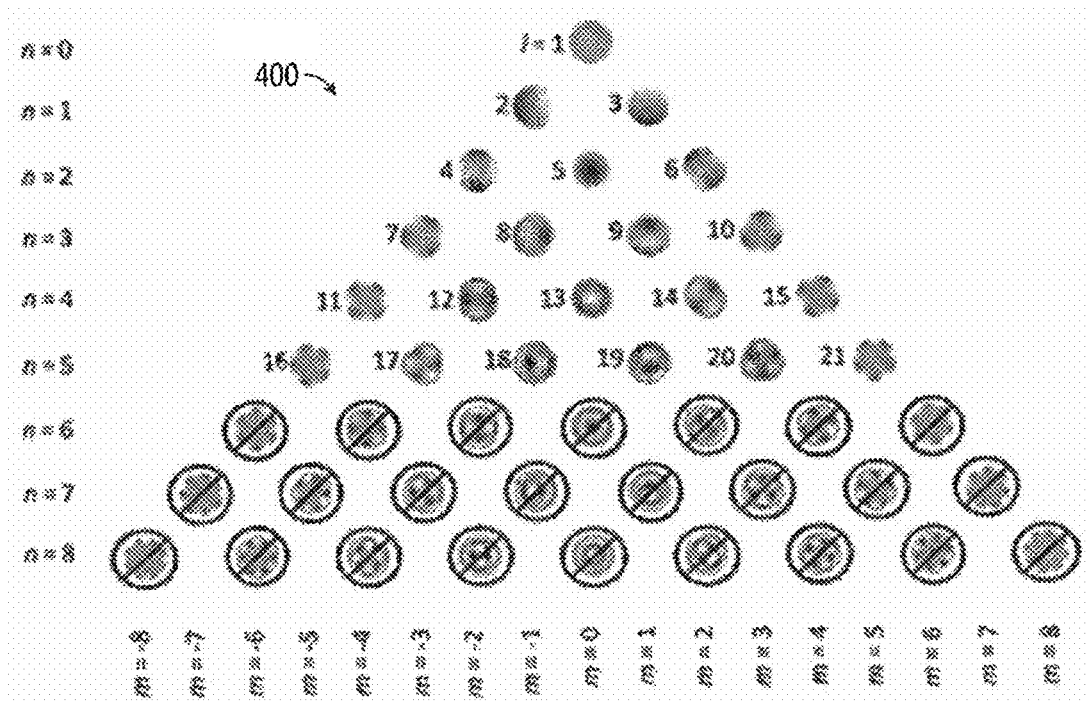
FIG. 4 illustrates an exemplary set of orthogonal polynomial functions defined by a circular surface.

For 2-D tomographic resistance imaging, the defined surface area 302 of the resistive sensing membrane 301 may comprise any arbitrary shape. For simplification, in a use case where the defined surface area 302 is circular, the orthogonal basis polynomial functions $\phi_i(r)$ may be a priori polynomial basis functions described by the Zernike polynomial equations, as shown in FIG. 4. FIG. 4 illustrates an exemplary set of orthogonal polynomial functions defined by a circular surface as expressed below.

$$Z_n^m(\rho, \varphi) = \begin{cases} R_n^m(\rho)\cos(m\varphi); & \text{for } m \text{ even} \\ R_n^m(\rho)\sin(m\varphi); & \text{for } m \text{ odd} \end{cases} \quad (3)$$

$$R_n^m(\rho) = \begin{cases} \sum_{k=0}^{\frac{n-m}{2}} \frac{(-1)^k (n-k)!}{k!\left(\frac{n+m}{2}-k\right)!\left(\frac{n-m}{2}-k\right)!} \rho^{n-2k}; & \text{for } n-m \text{ even} \\ 0; & \text{for } n-m \text{ odd} \end{cases}$$

The integer $n=\{0, 1, 2, \ldots\}$ ranks the resolution of the polynomial from low to high, and m satisfies $-n \leq m \leq n$. The radial function is described by $R_n^m(\rho)$ and the azimuthal function is a sine or cosine function with a harmonic order m. These basis functions are all orthogonal to each other, the coefficient vector "a" in Eq. 2 represents a compact expression of the complete set of all possible resistivity maps described by the basis, where a cutoff assuming the maximum number of allowable basis states N is imposed, where in FIG. 4, N=21.

For 3-D tomographic resistance imaging, the volume may have an arbitrary shape. For simplification in a use case when the defined volume is spherical, the orthogonal basis polynomial functions $\phi_i(r)$ are a priori polynomial basis functions may be described by spherical harmonic equations: expressed below.

$$S_l^m(\rho,\theta,\varphi) = \rho^l Y_l^m(\theta,\varphi)$$

$$Y_l^m(\theta,\varphi) = e^{im\varphi} P_l^m(\cos\theta) \quad (4)$$

where the functions $P_l^m(x)$ are associated Legendre polynomials:

$$P_l^m(x) = (-1)^m 2^l (1-x^2)^{m/2} \sum_{k=m}^{l} \frac{k!}{(k-m)!} x^{k-m} \binom{l}{k}\binom{\frac{l+k-1}{2}}{l} \quad (5)$$

such that the integer $l=\{0, 1, 2, \ldots\}$ ranks the resolution of the polynomial from low to high, and m satisfies $-l \leq m \leq +l$.

Figure 5:
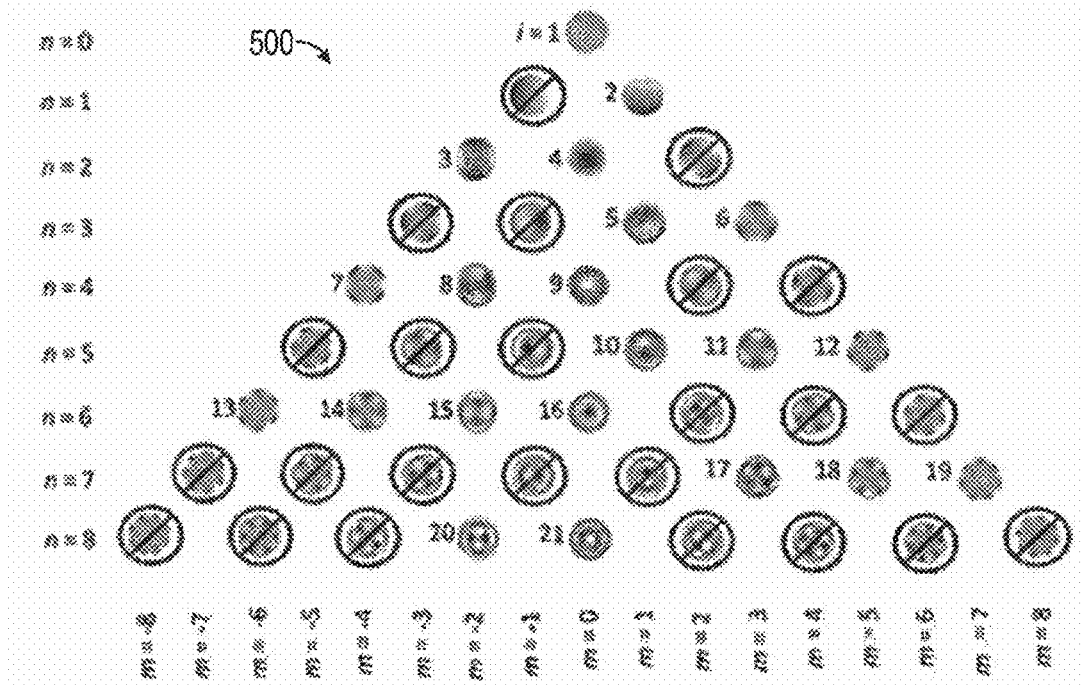
FIG. 5 illustrates a modified set of orthogonal polynomial functions to enhance image resolution under an unknown constraint.

A second example of an a priori polynomial basis may be a constrained polynomial basis. FIG. 5 illustrates a modified set of orthogonal polynomial functions that enhance image resolution under a constraint. FIG. 5 shows a case that the resistivity map is known to be mirror-symmetric in the x-coordinate plane. A subset of these basis states can then be disallowed (e.g., constrained), and are crossed off, accordingly, in the figure. The remainder of the allowable basis states are indexed "i" from a low to a high resolution, accordingly to control resolution at a maximum limit with a value of N=21.

A third example of an orthogonal basis is determined by applying a principle component analysis (PCA) to a representative set of likely resistance maps "a". The covariance matrix of the resistance maps may be expressed as:

$$\text{Cov}(a) = \Gamma_a \quad (6)$$

which can be diagonalized $$\Gamma_a = W^T \Lambda W \quad (7)$$

where the matrix $\Lambda$ is a diagonal matrix, and $WW^T = I$.

$$\Lambda = \text{diag}(\lambda_1, \lambda_2, \ldots, \lambda_N) \quad (8)$$

The eigenvalues of the covariance matrix can be ordered $\lambda_1 \geq \lambda_2 \geq \ldots \geq \lambda_N$, and the largest $\hat{N}$ eigenvalues of the covariance matrix as the principle components.

$$\Gamma_a^{PCA} = W^T \Lambda^{PCA} W, \Lambda^{PCA} = \text{diag}(\lambda_1, \lambda_2, \ldots, \lambda_{\hat{N}}, 0, \ldots, 0) \quad (9)$$

Here W is comprised of all eigenvectors, $W = [w_1\ w_2 \ldots w_N]$. Thus, the orthogonal basis then can be represented by the reduced basis $w_1, w_2, \ldots, w_{\hat{N}}$, and the eigenvectors W of the covariance matrix with largest eigenvalues □N are used as orthogonal basis functions with index i whose upper limit N is the same as the maximum number of independent tetra-polar measurements.

A fourth example of an orthogonal basis is a combination of the above methods (e.g., a priori, constrained, and principle component analysis basis functions). In this example, the principle component analysis of the third method may reveal only a limited number $\hat{N}$ of basis functions before the covariance vanishes into the noise. But since the total number of independent measurements in the problem is N from Eq. 1, the disclosed method allows the remaining $N-\hat{N}$ basis functions to be determined as a priori polynomial functions or constrained a priori polynomial functions, chosen to be orthogonal to the $\hat{N}$ members of the principle component basis.

Another approach tailors the choice of orthogonal basis functions to the highest resolution in the constrained region where the information is most critical relative to a known background or other constraint. This approach overcomes the disadvantages in uniform finite element meshes over a volume. If the region of interest in finite element meshes is local within that volume, then computational time and mathematical resolution is wasted on regions that are not useful.

If there are constraints and/or local regions of interest in the tomographic problem, then the orthogonal basis functions can be restricted to map features within only that region. Thus, the full power of the tomographic resolution is devoted to the region where information is needed.

The disclosed detections select electrode locations that have the highest resolution in discerning the orthogonal basis functions of interest. Current tomographic methods may place contacts at regular intervals around the periphery of the resistive object's volume to be mapped. This is detrimental for two reasons.

Figure 8:
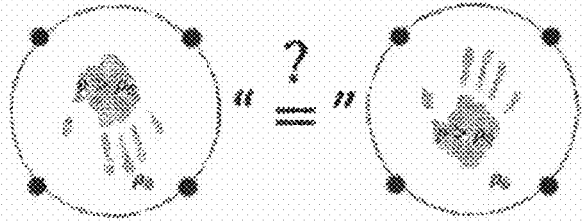
FIG. 8 illustrates the importance of having asymmetrically placed contact electrodes to eliminate sign errors in the mapping algorithm.
Figure 8:
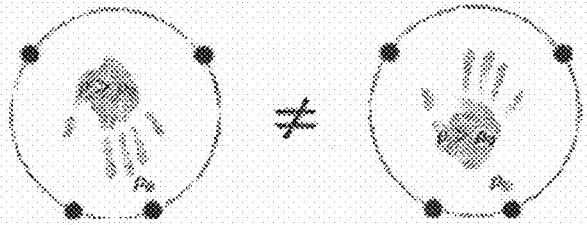

First, symmetric placement of contacts may result in a reduced number of independent measurements, reducing the maximum achievable resolution of the resistivity map. This point is illustrated in FIG. 8 where symmetric placement of four contact electrodes would yield the same tetra-polar resistance values for the correct tomographic image as for its inverted image, whereas asymmetrically placed contact electrodes would yield different tetra-polar resistances for the original image and its inverse.

Second, many tomographic systems may have a known background resistivity. The goal is to map only deviations from the resistivity. Strategic placement of contact electrodes may result in maximum sensitivity to these deviations. The disclosed detection applies the orthogonal basis functions to determine where contact electrodes should be placed to have maximum sensitivity in discerning independent measurements.

Figure 9:
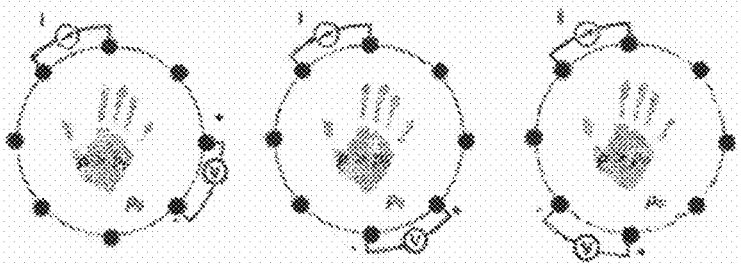
FIG. 9 illustrates electrode configurations for improving the signal-to-noise ratio.
Figure 9:
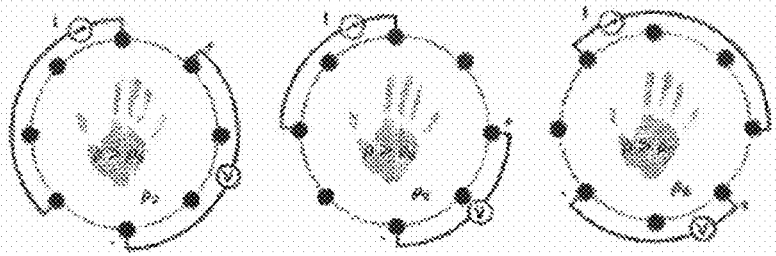

The detections also identify what pairs of current and voltage electrodes should be measured to provide the maximally independent set of complete measurements while maximizing signal-to-noise measurements. There are very many ways to collect a complete measurement set of N independent tetra-polar resistances, and by optimizing the choice of current-electrode pairs and voltage-electrode pairs, the disclosed detection makes it possible to choose a set that gives maximally independent measurements, and a maximal signal-to-noise ratio output. This is illustrated in FIG. 9 where the standard method (top row) is shown to use neighboring contact pairs for +/− current I and +/− voltage V, which leads to small voltage signals when the voltage pair is on the opposite side of the sample from the current pair. However, a tetra-polar resistance that has a larger distance between the + and − leads for both current I and voltage V (bottom row) will have larger voltage signals, and therefore lead to higher accuracy tomographic mapping. This maximally independent and maximal signal-to-noise output set of complete measurements can be predetermined through simulations.

An exemplary application of a tomographic device is a pressure-sensitive polymer pad infused with carbon-nanotubes, carbon-black, or a combination of conductive particles that cause the polymer resistivity to change locally under an applied force as shown in FIG. 1. An exemplary tomographic sensor comprises a circular area of a pressure-sensitive polymer, with a pressure pattern, such as a handprint, causing local resistivity changes $\rho(r)$ as shown in FIG. 2. In FIG. 2 the bottom trace of the graph shows the applied pressure d either in a square wave (left) or in spikes (right), and the top trace of the graph shows a clear resistivity response, accordingly.

The resistivity pattern can be measured as shown in FIG. 3 with a series of resistivity measurements through electrodes at the periphery of the sensor. A microcontroller unit (MCU) can regulate a selector to cycle through different electrode pairs used as current and voltage electrodes. When the current between two electrodes is applied, the voltage across two different electrodes is measured. Each resulting measurement is fed into an analog-to-digital converter and then back to the MCU which will store this measurement in memory and then direct the next measurement to be started. The complete set of independent measurements with N different elements is called the measurement vector $M_{measured}$.

In FIG. 5, the central computer reads the measurement vector $M_{measured}$ from the memory of the MCU and conducts an iterative loop to determine what the resistivity map must be to generate this measurement vector. A candidate resistivity map of the sample $\rho_{predicted}(r)$ is chosen and its resulting measurement vector $M_{predicted}$ is derived. If the two measurement vectors are different, then the predicted sample resistivity is adjusted using a quasi-Newton method, simulated annealing, or a similar self-consistent recursive method, and the process iterated until the two measurement vectors are identical within a specified tolerance.

In FIG. 3, an example of a basis functions for a circular sample are shown, where it is assumed that twenty-one (N=21) unique measurements can be performed, therefore the basis will consist of twenty-one different polynomial functions that are mutually orthogonal over the sample area. In this use case, a common orthogonal set of basis functions comprise the Zernike polynomials, exhibited graphically in FIG. 3. Only the first twenty-one basis functions are used, hence the remaining crossed out polynomials indicates functions whose resolution is higher than what can be achieved with 21 different measurements. The solid black line indicates functions whose resolution is higher than what can be achieved with the twenty-one different measurements. The resistivity is expressed in terms of these basis functions according to Eq. 1 above.

The detection identifies which pairs of current and voltage electrodes are measured to provide maximal independence. In FIG. 4, an example of a constrained basis is shown. In this use case, the resistivity map is symmetric in the x-plane and the twenty-one basis functions need not include functions that violate this symmetry. Overall, the resolution can be enhanced to finer details as seen in the size of the features at the bottom row of FIG. 4.

Figure 6:
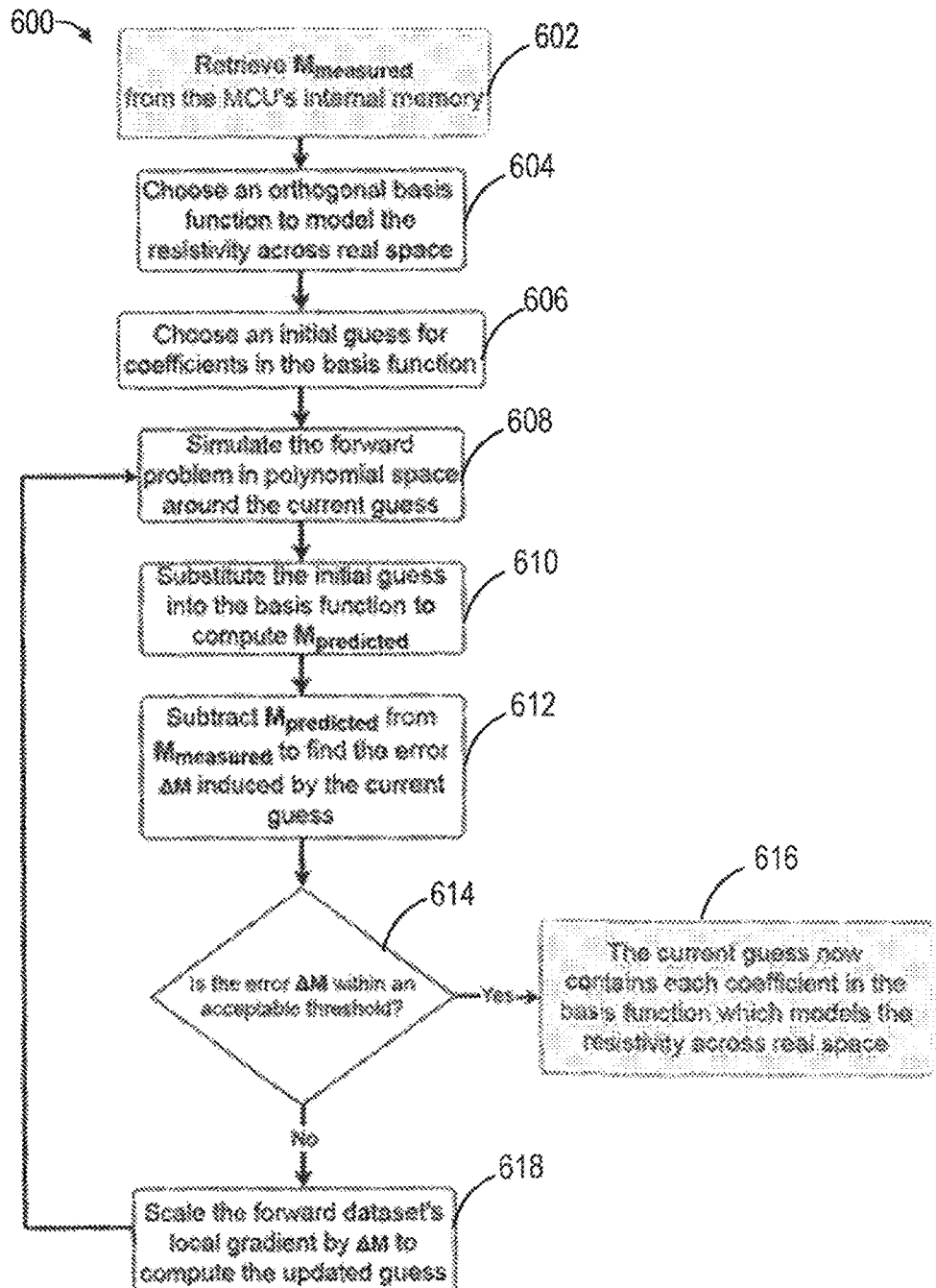
FIG. 6 illustrates an exemplary algorithm to carry out tomographic mapping.

FIG. 6 illustrates an exemplary algorithm that executes the tomographic mapping. Flow chart of the algorithm invert the resistance measurements to derive the local resistance pattern. In step 602, the resistance measurement vector $M_{measured}$ may be retrieved from the MCU. In step 604, the detection selects an orthogonal basis function to model the resistivity across real space. In step 606, the detection establishes the coefficients based on an empirical estimate in the basis function. In step 608, the detection simulates a forward problem in polynomial space around the current estimate. In step 610, the detection substitutes the initial estimate into the basis function to compute $M_{predicted}$. In step 612, the detection subtracts $M_{predicted}$ from $M_{measured}$ to derive the error $\Delta M$ induced by the current estimate. The result is compared to the resistance measurement vector $M_{predicted}$ derived from the initial estimate at the coefficients for the resistivity map basis functions. The two measurement vectors are compared in step 614. If the error $\Delta M$ falls within a predetermined threshold, the current estimate will contain each coefficient in the basis function which models the resistivity across real space. If it does not fall within the predetermined threshold, the process scale the forward database's local gradient by $\Delta M$ to compute the updated estimate, and the estimate is iteratively updated until the two become equal within the specified tolerance and the process repeats at step 608.

Figure 7:
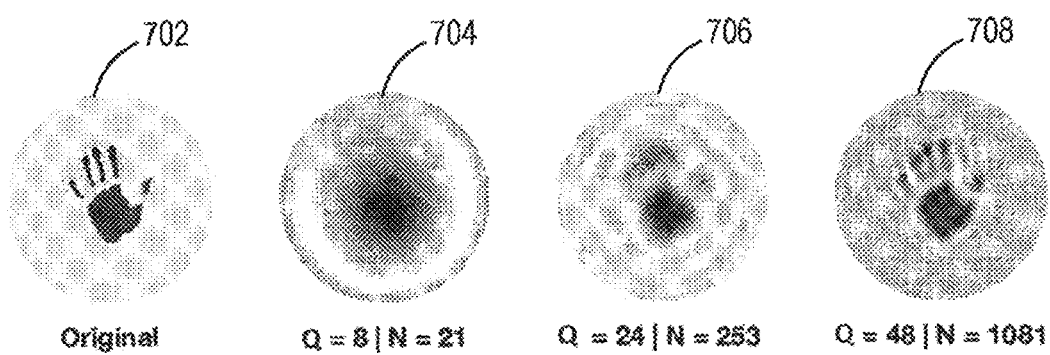
FIG. 7 illustrates different resolutions of tomographic resistance image with increasing number of contact electrodes.

FIG. 7 illustrates different resolutions of tomographic resistance image. An original 2D map example of a handprint (left) may be measured with maximum achievable resolution for Q=8 contact electrodes (N=21 independent measurements), Q=24 contact electrodes (N=253 independent measurements), and Q=48 contact electrodes (N=1081 independent measurements). The maximum resolution of the image clearly depends on the number of contacts and possible tetra-polar resistance measurement combinations.

FIG. 8 illustrates how placement of contact electrodes can affect the accuracy of the measurement. If, for example, the tomographic area is top-to-bottom reflection symmetric (in this case the shape of a circle) and the contact electrode placement is also top-to-bottom reflection symmetric (top row), then all tetra-polar resistances measured using these contacts cannot distinguish between the correct hand image and its top-to-bottom reflected mirror image. However, if the contact electrodes are placed asymmetrically (bottom row) so as to not possess top-to-bottom reflection symmetry, the contact electrodes would measure different tetra-polar resistances for the correct hand image and its top-to-bottom reflected mirror image, thereby gathering more information about the sample of interest via asymmetric placement of contact electrodes.

FIG. 9 illustrates how choice of contact electrode pairs can increase the signal and therefore increase the accuracy and resolution of the measurement. The top row illustrates the standard method of choosing tetra-polar resistances whereby neighboring contact electrodes are used as voltage and current electrode pairs to constitute a complete set of N independent tetra-polar measurements. However when the neighboring pairs are on opposite sides of the sample, the signal voltage can be quite small, reducing the signal-to-noise ratio. On the other hand, the measurements on the bottom row will have larger signals since the positive current electrode is closer to the positive voltage electrode, and the negative current electrode is closer to the negative voltage electrode. The complete set of N independent tetra-polar measurements will therefore have a larger signal-to-noise ratio and demonstrate increased accuracy.

Optimizing Electrical Impedance Tomography

Electrical impedance tomography (EIT) is a noninvasive imaging method whereby electrical measurements on the boundary of a conductive medium (e.g., the data) may be taken according to a prescribed protocol set and inverted to map the internal conductivity (e.g., the model). Described herein is a sensitivity analysis method and corresponding inversion and protocol optimization method that may generalize the criteria for tomographic inversion to minimize the model-space dimensionality and maximize data importance. The methods described herein may use sensitivity vectors represented as rows of a Jacobian matrix in the linearized forward problem to map targeted conductivity features from model-space to data-space. A volumetric outer-product of these vectors in model-space, referred to as the sensitivity parallelotope volume, may provide a figure-of-merit for data protocol optimization. Orthonormal basis functions that accurately constrain the model-space to features of interest may be defined from a priori information. By increasing the contact number to expand the number of possible measurements $D_{max}$, and by reducing the model-space to a minimal number $M_0$ of basis functions to describe the features of interest, the $M_0 \ll D_{max}$ sensitivity vectors of greatest length and maximal orthogonality that span this model-space may be identified. The reduction in model-space dimensionality may accelerate the inversion by several orders of magnitude. The enhanced sensitivity may tolerate noise levels up to 1,000 times larger than standard protocols.

1. INTRODUCTION

Electrical impedance tomography (EIT) of conducting volumes holds great promise as an alternative to X-ray computed tomography (CT) and magnetic resonance imaging (MRI) with applications in medicine, engineering, and geoscience, but is not commonly used because of its diffuse nature. The disadvantage of EIT's diffuse nature may be compensated for by the advantages of being radiation-free, easily portable, wearable, and low-cost. But two longstanding challenges have prevented EIT from realizing rapid refresh rates and being robust against experimental noise. First, the computational time of existing algorithms typically increase geometrically with the number of model-space parameters, and the ill-posed nature of the inverse problem under standard algorithms may require a dense mesh of up to 10,000 such model parameters. Thus, fast EIT refresh times may become feasible only at the cost of reducing resolution. Second, present-day EIT relies on measurement protocols that include small-signal measurements that are vulnerable to experimental noise. Error in these small-signal measurements may unavoidably impair the fidelity of the inverse problem, thereby reducing the resolution. Described herein is a new sensitivity analysis method which may accelerate the computations to reduce the computational time by orders of magnitude by reducing the model-space to the resolution of interest, and may improve the robustness to noise by orders of magnitude by eliminating low sensitivity measurements from the EIT protocol.

The remainder of this disclosure is structured as follows. Section 2 will review EIT concepts and introduce the notation adopted herein for the disclosed methods of optimizing EIT. Section 3.1 introduces the reduced model-space, which may be chosen to have a minimized number of elements to represent the desired resolution or the features of interest. Section 3.2 explains determining a quantity of contacts that may be ideal to benefit from the sensitivity analysis method. Section 3.3 introduces the measurement-space whereby a deliberately large number of contacts may be chosen to exceed a minimum necessary to map the model-space. Section 3.4 introduces the data-space that may be chosen from this vast measurement-space to maximize sensitivity and linear independence. Finally, Section 3.5 introduces two iterative Newton's method approaches to solve the inverse problem under this sensitivity paradigm. Section 4 shows the results of simulations that apply these methods to different applications. An outline overview of the sensitivity enhanced measurement analysis and protocol is provided below:

(i) Model-Space (Sec. 3.1)
  (a) Reference model based on prior knowledge
  (b) Orthonormal basis based on features or resolution desired
(ii) Contact Allocation (Sec. 3.2)
(iii) Measurement-Space (Sec. 3.3)
(iv) Data-Space (Sec. 3.4)
  (a) Pruning criteria for measurement-space
  (b) Optimal measurement protocol selection:
    1. Maximize sensitivity parallelotope volume
    2. Other protocol optimization criteria
(v) Inverse Solution for Sensitivity Analysis (Sec. 3.5)
  (a) (Truncated) Singular Value Decomposition Inverse Solving
  (b) Regularized Inverse Solving

2. STANDARD ELECTRICAL IMPEDANCE TOMOGRAPHY METHOD AND PROTOCOLS

Components at the essence of electrical impedance tomography (EIT) are reviewed in this section to establish the notation used in the remainder of the present disclosure. The generalized forward problem $$d = F(m) \tag{10}$$

relates a vector m in model-space, whose basis vectors describe the conductivity distribution, to a vector d in data-space, whose basis vectors describe the measurements taken. Typically, this forward problem may be directly solved using Maxwell's equations and various boundary conditions, and details may be found in the book "Electrical Impedance Tomography: Methods, History and Applications" by Holder [1].

EIT is classified as an inverse problem, whereby the data vector d is given, and the model vector m is to be solved for. In the presence of experimental data noise n, the observed data $d^{obs}$ may be written as:

$$d^{obs} = F(m) + n. \tag{11}$$

The forward operation F(m) may be Taylor expanded to linear order, $$J_{\alpha,\beta} = \frac{\partial F_\alpha}{\partial m_\beta}, \tag{12}$$

where $\alpha \in \{1, \ldots D_0\}$ indexes the data values from 1 to the rank of the data vector $D_0$ (the dimensionality of the data-space), and $\beta \in \{1, \ldots, M_0\}$ indexes the model elements from 1 to the rank of the model vector $M_0$ (the dimensionality of the model-space). The forward problem may then be represented by the Jacobian matrix $$d^{obs} = Jm + n, \tag{13}$$

where each element of the Jacobian quantifies the change in a data-space element with respect to a change in a model-space component. If the magnitude of a Jacobian matrix element is large, then small changes in the corresponding model-space component may result in large swings in the observed data, implying high sensitivity of that particular measurement to that feature in model-space. It is precisely this concept of sensitivity which inspires the figure-of-merit for optimizing measurement protocols in Section 3.

2.1. The Model-Space

In most EIT treatments, the model-space is represented with a finite element mesh. The number of independent model elements may be indexed $b \in \{1 \ldots M_{max}\}$, where $M_{max}$ is the number of independent mesh elements, and $M_{max}$ is sufficiently large for the discrete mesh to approximate a continuum solution to Maxwell's equations. But in order to solve the inverse problem, the conductivity is typically determined for each of these $M_{max}$ mesh elements, and the number of unique data values $D_0$ measured at the sample boundary is typically much less than the number of mesh points $D_0 << M_{max}$. The resulting inverse problem may therefore be greatly under-determined and lacking a unique solution, producing instead many equally likely conductivity maps for a given set of boundary data values. Thus, inverse solving methods typically implement regularization techniques to artificially select one solution from among the others, usually prioritizing smoothness with a weighting term in the regularization.

As an alternative to representing model-space with a large number $M_{max}$ of mesh pieces, one can instead represent it with a reduced number $M_0$ of orthonormal basis functions that are defined over the mesh whereby $M_0 << M_{max}$. Conductivity maps may then be represented as linear superpositions of these individual basis functions, and prior knowledge of the problem may be used to select appropriate basis functions. These basis functions may thereby reduce model-space dimensionality, and may reduce or eliminate the under-determined nature of the problem.

A reduced dimensionality model-space may have the advantage of greatly reduced computational time. For example, any EIT inversion requires Jacobian solvers and their computation time is empirically observed to scale approximately as $M_0^{3/2}$ with the number of model-space elements $M_0$ [2]. One way to reduce the size of the model-space is the approach taken by Vauhkonen et al., who created orthonormal basis functions for thorax EIT imaging using anatomical information and a proper orthogonal decomposition (POD) of previously collected data [3]. A similar approach was taken by Lipponen et al. who used POD to produce orthonormal basis functions for the location of circular inhomogeneities within a sample of otherwise homogeneous conductivity [4]. The resulting basis functions show strong resemblance to orthonormal polynomial basis functions defined over a circular domain called Zernike polynomials [5]. Together, these results suggest that for a circular sample in the absence of data for proper orthogonal decomposition, the Zernike polynomial functions provide an excellent empirical basis. When selecting a sub set of these polynomials to use as a basis, Vauhkonen et al. recommend using a number $M_0$ less than or equal to the amount of information being measured $M_0 \leq D_0$ to reduce the ill-posed nature of the problem [3]. This recommendation is supported by Tang et al., whose work indicates that one should also consider any knowledge of relative feature location when selecting basis functions [6].

2.2. The Data-Space

Each four-point resistance measurement may correspond to a single data element in the data vector to be inverted in the tomographic problem. From the C available contact electrodes, each resistance measurement may be made with two current and two voltage contact pairs, constituting a four-point measurement, often called a "tetrapolar" resistance measurement in the biomedical device community [7]. Adopting the van der Pauw notation [8], the current and voltage contacts of each four-point measurement are designated [$I_+$, $I_-$, $V_-$, $V_+$]. Though some EIT efforts consider two-point measurements [9] [10], the analysis here will be restricted to the four-point configuration since it tolerates finite contact impedances common to most experimental applications, such as in biomedicine [11]. When a particular set of $D_0$ data measurements is designated for tomographic inversion, this sequence will be referred to as a measurement protocol.

There may be a large number of possible four-point measurement protocols for a given number of contacts C. There are $$\binom{C}{4}$$

different ways of selecting a particular combination of 4 contacts i, j, k, l, and there are three unique four-point resistance values that may be measured with these four contacts, for example, [i, j, k, l], [j, k, l, i], and [i, k, j, l]. All other permutations of these same 4 contacts may yield either the same resistance value due to the Onsager reciprocity relation (whereby resistance values are equal when current and voltage pairs are swapped) [12] or the negative thereof (due to polarity switching.) It is worth noting that, of the three measurement values above, only two are linearly independent, and the third one is a linear combination of the other two. Thus, the total number of data measurements that yield different, but not necessarily independent, resistance values is:

$$D_{max} = 3\binom{C}{4} = \frac{3C!}{4!(C-4)!}. \quad (14)$$

This number $D_{max}$ includes many resistance values that are not linearly independent such as when two measurements share three contacts, [i, j, k, l] and [i, j, l, m], and the resistance measurement [i, j, k, m] returns a value that is merely the sum of the first two. To make every possible measurement would not only be impractical with the number of measurements $D_{max}$ diverging as $O(C^4)$, it may also be entirely unnecessary given the amount of redundant information described above. Thus, a typical measurement protocol may concern a smaller data subset $D_0$ of these measurements such that $D_0 \ll D_{max}$.

The number $D_I$ of possible independent measurements for C contacts [13] is important in the classification of a protocol as redundant, efficient, or compliant:

$$D_I = \frac{C(C-3)}{2}. \quad (15)$$

If the number of measurements in a protocol $D_0$ is less than the number of independent measurements $D_0 < D_I$, then we will describe the protocol as "compliant," meaning that there is independent information available that may not be measured. If, on the other hand, $D_0 > D_I$, then we shall call such a protocol "redundant," since more measurements may be taken than necessary to acquire all the independent data. Finally, the case where all possible independent data measurements are represented in the protocol $D_0 = D_I$, shall be called "efficient". The above definitions are summarized in Table 1.

Redundant protocols may be helpful in noise reduction, since in the presence of experimental noise, a redundancy factor r defined as $D_0 = r D_I$ may reduce the overall measurement noise by a factor of $\sqrt{r}$. However, both redundant and efficient protocols may include many low sensitivity measurements which, in the presence of experimental noise, may be a primary source of errors in the tomographic inversion.

TABLE 1

Protocol Classification

| Redundant: | $D_0 > D_I$, $D_0 = r D_I$ (r, redundancy factor) |
| Efficient: | $D_0 = D_I$, |
| Compliant: | $D_0 < D_I$, $c D_0 = D_I$ (c, compliance factor) |

Classification of protocols in terms of the amount of data collected. $D_0$ is the number of measurement data collected; $D_I$ is the number of independent data possible.

Therefore, a key strategy of the disclosed methodology is to recognize that compliant protocols have the advantage of facilitating a sub selection of only the highest signal measurements for the protocol. Thus, compliant protocols such as those introduced in Section 3 may provide great robustness to experimental noise, as demonstrated in the simulated tomographic inversions in Section 4.

In choosing independent measurements to comprise a protocol, it is useful to identify which measurements may be relatively insensitive to changes in model-space, and which measurements may use similarly positioned contacts so as to be sensitive to largely the same features. Low sensitivity measurements may be identified by inspection as measurements where either the current or voltage terminal pairs (or both) neighbor each other, often referred to as "adjacent" measurements [14]. If the current pairs are neighboring, the voltage may be dropped only over a small region of the sample between those two contacts where no voltage contacts are available to measure. If the voltage terminals are neighboring, small voltage amplitudes may be measured. One may naively think that the best protocols with the strongest signals would then require that one avoid neighboring current or voltage pairs. However, the second problem of similar measurement pairs may come into play. Consider a low sensitivity measurement [i, j, l, m] where, for example, voltage contacts l and m are neighboring each other. This low sensitivity measurement may be added to a high sensitivity measurement [i, j, k, l] to yield the high sensitivity measurement [i, j, k, m]. Although both [i, j, k, l] and [i, j, k, m] may have high sensitivity and may be linearly independent from each other, their similarity aside from a small sensitivity measurement means that they may effectively provide no stronger a measurement than if the low sensitivity measurement were, itself, in the protocol instead of either of these.

We will now examine some protocols and qualify them according to their compliant, efficient, or redundant character, as well as whether they are prone to low sensitivity measurements as described above. In the published literature, most EIT studies use the Sheffield protocol to take four-point resistance measurements [13]. Under this protocol, the number of measurements is $D_S = C(C-3) = 2D_I$, which are taken "pairwise adjacent" whereby two current contacts neighbor one another and two voltage contacts neighbor one another. Starting with a given current pair, the nearest voltage pair is measured, and then the voltage pair rotated around the sample for each subsequent measurement until all remaining contact pairs have been measured. Then, the current pair is rotated by one step and the process repeated [13]. For C contacts indexed counter-clockwise around the sample, the full Sheffield protocol is tabulated below for the first current pair in the first column, the second current pair in the second column, etc.:

$$\begin{matrix} [1,2,3,4] & [2,3,4,5] & [3,4,5,6] & \ldots & [C,1,2,3] \\ [1,2,4,5] & [2,3,5,6] & \vdots & & \vdots \\ [1,2,5,6] & \vdots & \vdots & & \vdots \\ \vdots & \vdots & \vdots & & \vdots \\ [1,2,C-1,C] & [2,3,C,1] & [3,4,1,2] & \ldots & [C,1,C-2,C-1] \end{matrix} \quad (16)$$

The C-columns times (C−3)-rows in the table above confirm the number of measurements $D_S$ for the Sheffield protocol. The protocol redundancy factor of r=2 arises due to the Onsager reciprocity relation, whereby the top row is redundant with the bottom row, the second row with the second-to-last row, etc. When this redundancy is removed, the resulting efficient protocol with $D_I$ measurements will be referred to as the reduced Sheffield protocol. The empirically derived Sheffield protocol has the advantage of being easy to implement while treating all contacts symmetrically and has withstood the test of time in that no significantly superior redundant (or efficient) protocol in 2D has been determined, especially when no prior knowledge exists for the system under study.

Other heuristic protocols have been proposed, for example, throughout a series of papers by Adler to satisfy external measurement constraints [14], [15]. One of these suggests, for example, that adjacent measurements are not always ideal, especially for medical applications where low current levels are medically safer. Adler's publications developed nine (9) problem-specific figures-of-merit for trial and error comparisons of measurement protocols [14] [15][16][17][18][20]. However, as mentioned previously, all such efficient or redundant protocols suffer from the same drawback: they include either low sensitivity measurements or, equivalently, measurement pairs which differ by a low sensitivity measurement, since these protocols seek to exhaust as many independent measurements as possible for a given number of contacts. As a result, such protocols may be susceptible to low noise levels. As a final note, the measurement configurations proposed for these heuristic protocols are chosen in a somewhat ad hoc manner through trial and error, rather than according to a mathematically rigorous figure-of-merit. Section 3 discloses sensitivity as an appropriate figure-of-merit to identify the optimal compliant protocol from an increased space of possible measurements with increased contact number. The resulting sensitivity protocol is expected to be more robust to noise, while being mathematically justifiable through a figure-of-merit.

Other recent EIT efforts have tried to increase EIT performance through the selection of electrode placement and measurement protocols. For example, Karimi describes how variations in electrode placement can maximize "information gain" by using a double-loop Monte-Carlo approximation [21], and Smyl selected low-noise electrode positions for the 2D problem through deep learning with prior knowledge of the system under study [22]. The methods the sensitivity protocol uses for the measurement protocol optimization problem may also be applied to improve this electrode position optimization problem. Recent work by Ma uses a reduced selection of model-space features and measurement protocols via Bayesian methods for hand gesture recognition, using their methods to distinguish between eleven (11) different gestures [10]. Section 4 demonstrates how our disclosed sensitivity protocols show improved distinguishability in the presence of experimental noise.

2.3. Linear and Nonlinear Solutions

The methods to solve inverse problems fall under one of two categories, linear or nonlinear. In the linear problem introduced in Eq. 13, the forward problem is treated as simple matrix multiplication. The corresponding inverse problem may be written as:

$$m = J^{-g}(d+n), \quad (17)$$

where $J^{-g}$ is a generalized inverse of the Jacobian. In the case where model and data-spaces have the same size $M_0=D_0$, the Jacobian is square and the inverse of the Jacobian matrix $J^{-1}$ may be substituted ($J^{-g}=J^{-1}$).

However, the general EIT inverse problem is inherently nonlinear. One approach to solve this nonlinear problem is iteratively, such as with Newton's method, which may solve the nonlinear problem by solving a linear approximation at each iteration. For example, from the Jacobian of a previous iteration the data residuals of the present iteration may be calculated at each step. Each iteration may be treated as an update to the one prior, starting with the problem reference as the initial "guess". The iterative process may stop once this updated correction is deemed sufficiently small that the problem has converged to an optimal fit to the data. Iterative Newton's method processes are the most common methods for solving the EIT problem, including the popular open source MATLAB package EIDORS [23]. This package allows the use of mesh-based model-spaces and the selection of arbitrary data-spaces to simulate the linear and nonlinear forward EIT problem and solve the inverse EIT problem with a choice of various inverse solvers, such as the regularized inverse Newton's method approach described in Section 3.5.2.

3. SENSITIVITY ANALYSIS METHOD AND PROTOCOL

Figure 14:
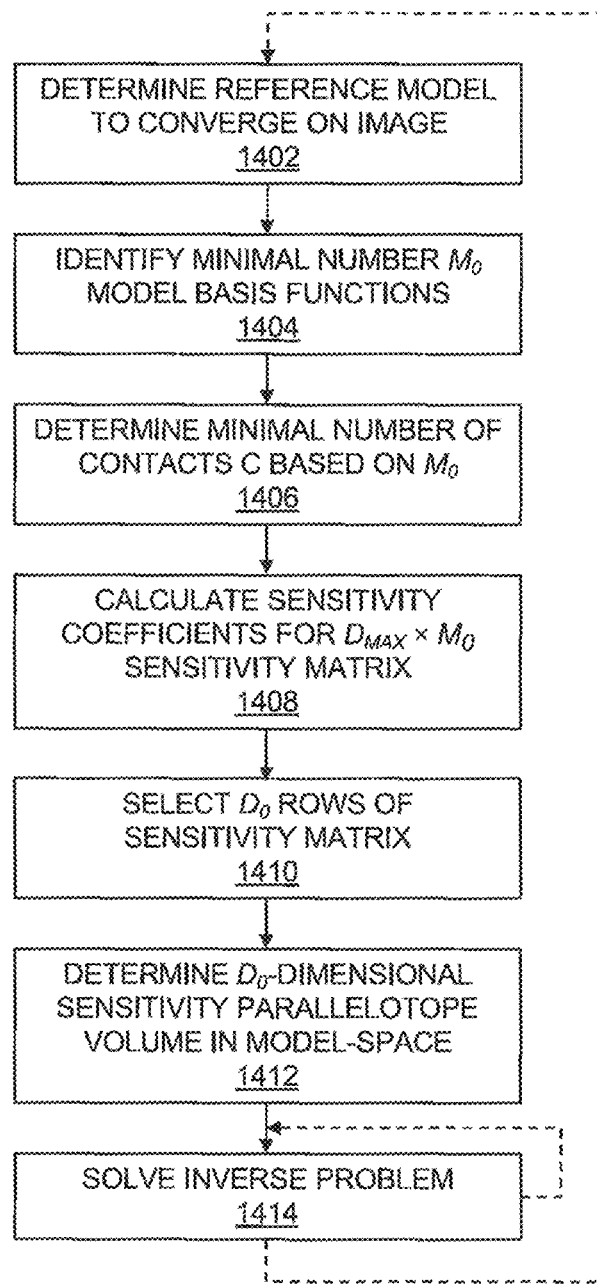
FIG. 14 illustrates an exemplary method for sensitivity analysis and protocol to reduce computation time to generate the tomographic resistance image.

FIG. 14 illustrates an exemplary method 1400 for sensitivity analysis and protocol corresponding to the following disclosure. The novelty of the proposed sensitivity analysis will now be explained with respect to the above-mentioned components of model-space, data-space, and inversion method. The model-space may be deliberately chosen to be small, identifying only the features or the resolution required, thereby accelerating the inverse problem. The data measurement protocol may be compliant to maximize noise tolerance by rejecting low sensitivity measurements from the protocol. And to draw attention to the importance of a compliant protocol, we distinguish two new steps in the sensitivity analysis, namely the contact allocation and the identification of the measurement-space. Contact allocation may guarantee that the number of data measurements $D_0$ is less than the number of possible independent measurements $D_I$, as per the criterion of a compliant protocol $D_I \gg D_0$. Identification of the measurement-space may represent a deliberately large set of all possible $D_{max}$ measurements and define the sensitivity vector for each measurement in order to set a figure-of-merit according to which measurements should be selected in the optimized protocol.

3.1. Model-Space for Sensitivity Analysis

We first address the selection of model-space and model reference under the sensitivity analysis, with the intent of leveraging prior knowledge to minimize the model-space dimension $M_0$. Following Section 2.1, the first step may be to determine a reference model from prior knowledge which will reduce the number of computational steps to converge on a final solution (Operation 1402). This reference may represent the background conductivity of the problem from which the final solution should be perturbatively related, if at all possible. An inhomogeneous reference has been encouraged by Grychtol and Adler whenever prior knowledge of the system allows [24]. The next step of the sensitivity analysis may be to identify a minimal number $M_0$ of model basis functions to describe the features that are to be discerned so that the corresponding computational load may be minimized (Operation 1404). Again following Section 2.1, the minimal basis may either be determined according to a resolution criterion or by targeting specific features of interest, such as through proper orthogonal decomposition. [3]

The model-space that will be used in an example for illustration of these concepts herein will be a circular domain with orthonormal polynomials as basis functions. To simplify the choice of reference in the present example, we employ a homogeneous constant background reference for compatibility with generic 2D systems. Given the circular symmetry of our test problem, Zernike polynomials defined over a mesh will serve as conductivity basis functions for the model-space. The orthonormal Zernike polynomial functions are defined on a unit disk in terms of polar coordinates $Z_n^k(r, \theta)$, and represent increasing resolutions determined by a radial polynomial order n and an azimuthal order k [25] as illustrated in FIG. 10.

Figure 10:
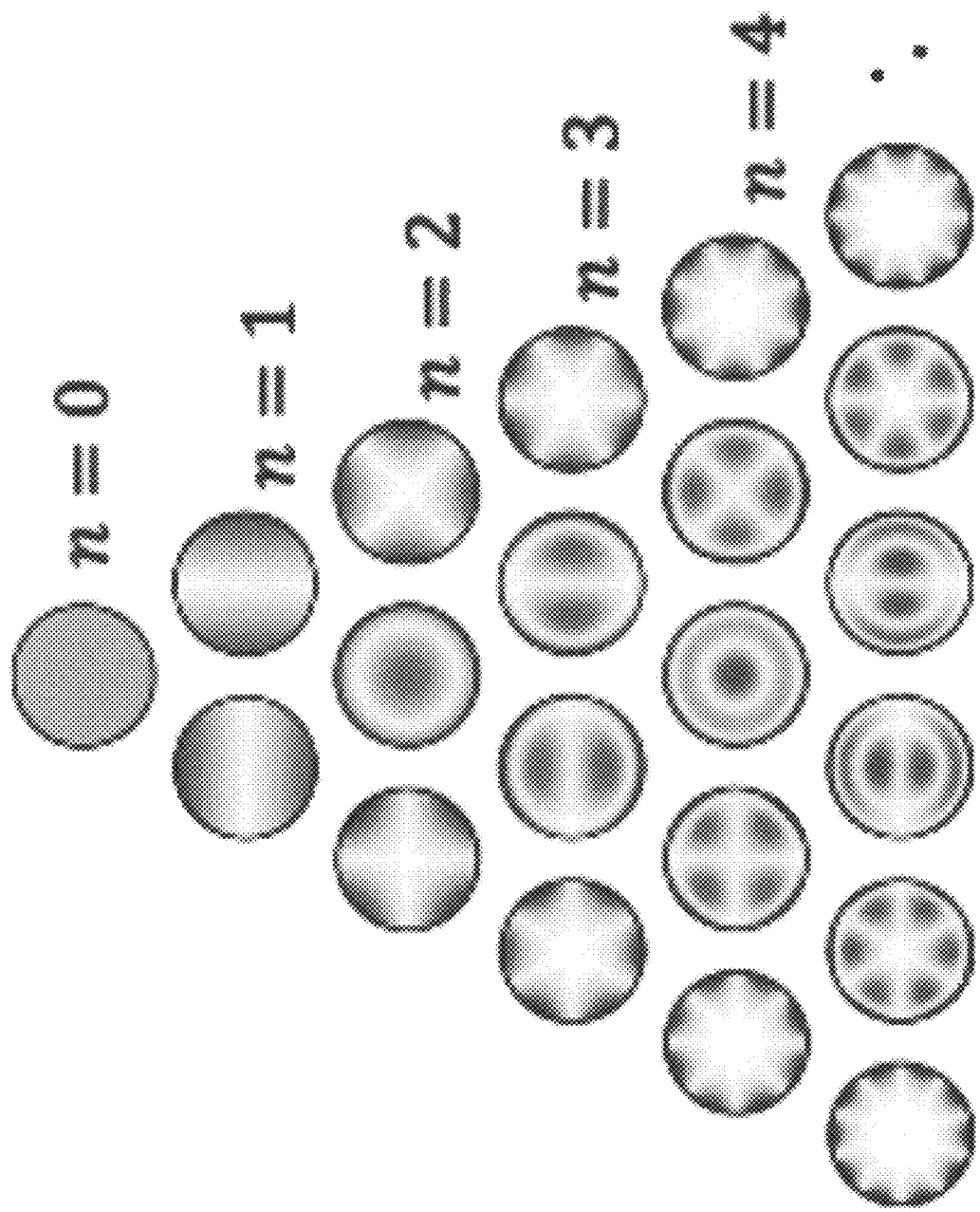
FIG. 10 illustrates an exemplary orthonormal set of Zernike polynomial basis functions.

FIG. 10 illustrates an exemplary orthonormal set of Zernike polynomial basis functions defined in Eq. 18 ranked n=0, 1, 2 . . . N from low to high resolution. Polynomial order n may be chosen to reduce the model dimensionality over the circular area from thousands of mesh points down to a handful $M_0$ of polynomials that achieve the intended resolution of the final tomographic resistance image map. The number of independent voltage measurements $D_0$ may be chosen, in turn, to match this number of basis functions $D_0=M_0$, thereby creating an exactly determined problem and a square Jacobian matrix for inversion of the linear forward problem. In practice, the order N of the polynomial may be chosen such that $M_{Z(N)} \geq M_0$, where the $M_0$ polynomials for the model-space basis are chosen to suit the prior knowledge of the symmetry or desired resolution for the problem at hand.

$$Z_n^k(r,\theta) = \begin{cases} F_n^k R_n^{|k|} r\cos(k\theta) & \text{for } k \geq 0 \\ -F_n^k R_n^{|k|} r\sin(m\theta) & \text{for } k < 0 \end{cases} \quad (18)$$

where $R_n^{|k|}$ is defined as $$R_n^{|k|}(r) = \sum_{l=0}^{\frac{n-k}{2}} \frac{(-1)^l (n-l)!}{l!\left(\frac{n+k}{2}-l\right)!\left(\frac{n-k}{2}-l\right)!} r^{n-2l}. \quad (19)$$

The normalization prefactor $F_n^k$ normalizes the integral of the polynomials over the unit circle, $$F_n^k = \sqrt{\frac{2(n+1)}{1+\delta_{ko}}} \quad (20)$$

and contains the Kronecker delta function $\delta_{n0}$. The Zernike polynomials satisfy the orthonormal condition, $$\int_{\theta=0}^{2\pi} \int_{r=0}^{1} Z_n^k Z_{n'}^{k'} \, dr d\theta = \delta_{n,n'} \delta_{k,k'}. \quad (21)$$

Using this polynomial basis, we may represent any conductivity map as a linear combination of Zernike polynomials:

$$\sigma(r,\theta) = \Sigma_{n=0}^{N} \Sigma_{k=-n,-n+2, \ldots n} m_{n,k} Z_n^k(r,\theta), \quad (22)$$

where N is the highest polynomial order of the Zernike polynomials used. The weight of each polynomial is given by the coefficient $m_{n,k}$, whose components together define the model-space vector representation of the conductivity. For a given polynomial order N, the dimension $M_{Z(N)}$ of the model-space up to and including that polynomial order is:

$$M_{Z(N)} = \sum_{j=0}^{N} (j+1) = \frac{(N+1)(N+2)}{2}. \quad (23)$$

3.2. Contact Allocation for Sensitivity Analysis

A design aspect unique to the sensitivity analysis is contact allocation—determining a quantity of electrical contacts C that provide the desired resolution or features. For standard protocols the logic is normally reversed: the number of contacts C is given a priori, necessitating $D_I$ or more independent measurements according to Eq. 15, where the number of measurements $D_0=rD_I$ is either efficient (r=1) or redundant (r>1), as described in Section 2.2. For example, the reduced Sheffield protocol is an efficient protocol with r=1 and the standard Sheffield protocol is redundant with redundancy factor r=2. In the sensitivity analysis disclosed herein, the number of possible independent measurements $D_I$ should greatly exceed the number of measurements in the protocol $D_0=M_0$, whereby $D_0 \ll D_I$. In practice, this is achieved by simply increasing the number of contacts, per Eq. 14. One may explicitly invert Eq. 14 and deduce the following expression for the minimum number of contacts C needed to make $D_0$ independent data measurements:

$$C(D_0) = \text{ceil}\left(\frac{3}{2} + \sqrt{\frac{9}{4} + 2D_0}\right) \quad (24)$$

where the ceiling function ceil(x) returns the smallest integer greater than or equal to x. According to Section 3.4, a compliant protocol is defined by the condition $D_0 < D_I$, so a compliance factor c may be defined as follows: $D_I = cD_0$. And the number of contacts to achieve this compliance condition for an exactly determined Jacobian may therefore be $C(cM_0)$, thereby determining the number of contacts directly from the number of model-space basis functions $M_0$ as well as the compliance factor c (Operation 1406). A compliance factor of c≥3 may be recommended, and the larger c is, the likelier the protocol may be optimized using only large-signal measurements. Note that unlike the Sheffield protocol, there may be no redundant measurements, as the sensitivity analysis may rely on enhanced sensitivity rather than measurement redundancy to increase tolerance to noise.

3.3. Measurement-Space for Sensitivity Analysis

Measurement-space is introduced as an integral component of the sensitivity analysis method disclosed herein. Borrowing from the data-space discussion in Section 2.2, recall that the total number of possible data measurements $D_{max}$ greatly exceeds the number of linearly independent measurements $D_I$. In this section, we shall define the space of all $D_{max}$ possible measurements as the measurement-space and introduce a metric whereby different measurements within this space may be quantified for their ability to distinguish model features, namely the sensitivity vector.

The sensitivity analysis proceeds as follows. Recalling the definition of a Jacobian, we define sensitivity coefficients $J_{\alpha,\beta}$ (Operation 1408) that measure the sensitivity of each $a \in \{1, \ldots D_{max}\}$ data measurement to each $\beta \in \{1, \ldots M_0\}$ model element:

$$J_{a,\beta} = \frac{\partial F_a}{\partial m_\beta}. \qquad (25)$$

This definition is identical to the Jacobian matrix elements of Eq. (12), except now the index a spans all of the $D_{max}$ possible data measurements, not merely the $D_0$ data measurements that are used for the tomographic inversion. We will refer to this larger matrix as the sensitivity matrix of dimension $D_{max} \times M_0$, from which $D_0$ select rows will be drawn to form the $D_0 \times M_0$ Jacobian matrix for the linearized forward problem. These rows, then, form an important component of the analysis, as each possible four-point measurement may be represented as a vector $\mu_a$ in model-space expressing the sensitivity of all model elements with respect to the $a^{th}$ data measurement:

$$\mu_a = [J_{a,1} J_{a,2} \ldots J_{a,M_0}]. \qquad (26)$$

The protocol optimization problem may now be reduced to selecting the $D_0$ rows from this sensitivity matrix (of dimension $D_{max} \times M_0$) that represent the data measurements best suited to resolving the $M_0$ desired model features.

Note that the sensitivity vectors and sensitivity matrix are not limited to the Zernike polynomial basis. Other bases may be preferred when given prior knowledge of the system. For example, proper orthogonal decomposition of a prior dataset allows orthogonal features to be ranked from highest to lowest relevance in the hierarchy. [3] Other a priori resolution requirements or targeted feature bases may be adapted, as well.

3.4. Data-Space for Sensitivity Analysis

The $D_0$ data measurements that comprise the data-space may be selected from the $D_{max}$ total measurements in measurement-space as an optimized subset that can span the desired $M_0$-element model-space (Operation 1410). To simplify the inverse problem and eliminate the need for regularization, an exactly determined square matrix may be chosen for the data-space Jacobian such that $D_0 = M_0$. As previously emphasized in Section 2.2, when optimizing a protocol it is important to avoid both measurements with low sensitivity and pairs of measurements with high similarity.

To address these protocol criteria, first a pruning threshold is determined to discard the lowest sensitivity measurements from consideration in the protocol. The magnitude of a sensitivity vector $|\mu_\alpha|$ may quantify the sensitivity of that measured data value to any changes in the model, where vectors with greater magnitude may be more noise-robust and lead to smaller posterior variance in the estimated model parameters from the inverse problem. Thus, a ranked list of the $D_{max}$ sensitivity vectors may be pruned, whereby those shorter than a certain threshold may be considered low sensitivity and discarded. Whereas pruning may not be necessary for the moderately low number of contacts C=27 considered here with $D_{max}$=52,650 different measurements per Eq. 14, it may be anticipated to be an important step in geometries with significantly more contacts.

Second, a criterion may be determined whereby similar measurements may be avoided within a protocol. In model-space, this similarity may manifest as nearly parallel orientation of the respective sensitivity vectors. The more orthogonal the sensitivity vectors are, the more they may represent independent measurements, giving a smaller posterior covariance of the model parameters in the inverse problem. Optimal protocols may therefore be formed from sets of long, mutually orthogonal sensitivity vectors, with the figure-of-merit for such a protocol being the $D_0$-dimensional sensitivity parallelotope volume subtended by the sensitivity vectors of the constituent measurements. For example, starting with two measurements, a parallelogram in model-space may be formed, representing the area $V_2$ subtended by the two respective sensitivity vectors $\mu_1$ and $\mu_2$. This area may be maximized provided the two chosen vectors are as long and orthogonal as possible. An additional third measurement with sensitivity vector $\mu_3$ may be most sensitive to independent model-space components provided its perpendicular component with respect to the plane of the original parallelogram is maximized, yielding a three-dimensional volume $V_3$, etc. Thus, a $D_0$-dimensional sensitivity parallelotope volume in model-space may be determined (Operation 1412). The product of the perpendicular components for all $D_0$ sensitivity vectors in a measurement protocol may give the following definition for the $D_0$-dimensional sensitivity parallelotope volume:

$$V_{D_0} = \Pi_\alpha^{D_0} |\mu_{\alpha\perp}| \qquad (27)$$

The perpendicular component $\mu_{\alpha\perp}$ of each successive measurement may be determined from the parallel component $\mu_{\alpha\|}$ of the $\alpha^{th}$ sensitivity vector relative to the subspace spanned by the orthogonal components of the preceding $\alpha-1$ measurements:

$$\mu_{\alpha\|} = \sum_{i=1}^{\alpha-1} \frac{\mu_{i\perp} \cdot \mu_\alpha}{|\mu_{i\perp}|^2} \mu_{i\perp}. \qquad (28)$$

The perpendicular component $\mu_{\alpha\perp}$ is then:

$$\mu_{\alpha\perp} = \mu_\alpha - \mu_{\alpha\|} \qquad (29)$$

The sensitivity parallelotope volume in model-space may be more formally calculated from the Jacobian made up of the sensitivity vectors of the $D_0$ selected measurements. The sensitivity parallelotope volume associated with the Jacobian matrix is:

$$V_{D_0} = \sqrt{\det(JJ^T)}, \qquad (30)$$

and is equivalent to that derived in Eq. 27. The above sensitivity parallelotope volume figure-of-merit may allow an objective and generalized optimization of the tomographic protocol.

Figure 11:
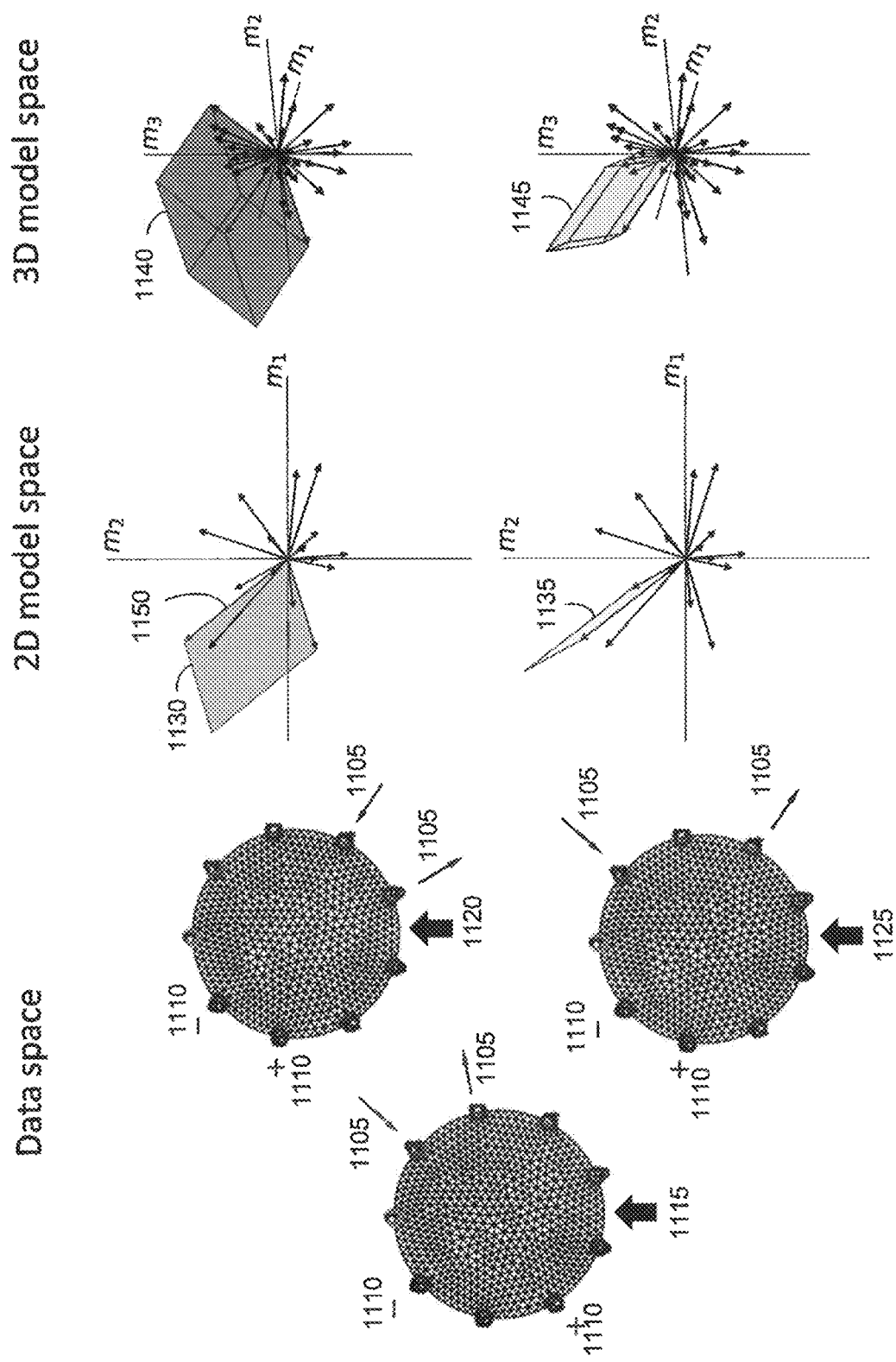
FIG. 11 illustrates exemplary sensitivity vectors and sensitivity parallelotope volumes.

FIG. 11 illustrates exemplary sensitivity vectors and the sensitivity parallelotope volumes. Under the heading "Data space" to the left, measurement schematics show current 1105 and voltage (+/−) terminals 1110 associated with three measurement configurations 1115, 1120, 1125 (clockwise from left.) With the first measurement 1115 selected, there are two choices for the subsequent measurement (1120, top; or 1125, bottom). Under the heading "2D model space" in the center column is the 2D model-space, where the axes are the model-space coefficients, $m_1$ and $m_2$, and the arrows represent sensitivity vectors corresponding to various possible measurements projected onto the $m_1$-$m_2$ plane. The parallelograms 1130, 1135 indicate the 2D sensitivity volume associated with a given pair of measurements, and the top parallelogram 1130 may be the better choice given the larger subtended area. Under the heading "3D model space" in the rightmost column, a third sensitivity vector is added to the set showing the 3D sensitivity parallelotope volume. Compared to the bottom parallelotope 1145, the top parallelotope 1140's volume again may be a better choice of measurements because it maximizes both the magnitude and the orthogonality of the sensitivity vectors in its set, thereby maximizing the parallelotope volume.

An example of the concept of parallelotope volume is illustrated in FIG. 11. An initial measurement 1115 in data-space (left) may generate a corresponding sensitivity vector 1150 in 2D model-space (center). There are two other candidate measurements shown in data-space (measurement 1120; measurement 1125) which subtend a large-area parallelogram 1130 (top) or small-area parallelogram 1135 (center) in 2D model-space. The measurement with larger 2D parallelogram area may create an overall larger sensitivity for the two-measurement protocol. Analogously, in 3D model-space (right) the three vectors form two candidate protocols with large 3D parallelotope volume 1140 (top) or small 3D parallelotope volume 1145 (bottom). Once again, the larger volume may correspond to an overall superior sensitivity for the protocol.

Several different search algorithms have been developed that maximize the sensitivity parallelotope volume. One such algorithm is a guided greedy search that may work well for smaller contact numbers C<50. This algorithm may buildup a protocol one measurement at a time, such that each newly added measurement produces the largest possible volume with respect to all prior selected measurements in the protocol. After a new measurement is selected, a secondary check of the other measurements may ensure that an alternate measurement will not increase the sensitivity parallelotope volume further. When a more optimal measurement is discovered during this double check, the checking process may start over again. Using this algorithm, and a compliance factor of c=3 corresponding to a three-fold increase in contact number over standard protocols, we have generated measurement protocols whose geometric averaged sensitivity vectors are two (2) to three (3) orders of magnitude larger than those of the reduced Sheffield protocol. This leads to a commensurate increase in the noise tolerance such that two (2) to three (3) orders of magnitude more noise may be tolerated while yielding a faithful tomographic map of the conductivity. This guided greedy search may be adapted to include a simulated annealing or Markov Chain Monte Carlo approach to add randomness to the search to improve search efficiency in the ever increasing measurement-space. Notably, this optimization process may only be computed once for each EIT problem prior to any inverse solving, enabling rapid real-time refresh of the tomographic inverse problem.

3.5. Inverse Solution for Sensitivity Analysis

To complete this EIT sensitivity analysis method, the inverse problem is solved (Operation 1414). As mentioned in Section 2, this is often done via a Newton's iterative method, whereby the nonlinear EIT problem is solved linearly with each iteration. In the following subsections, we will describe two approaches to a single iteration of a Newton's method solve. Either method may be iterated to solve the nonlinear problem. However, we have found that if perturbations from the initial solve guess are sufficiently small, a single iteration of the below methods provide sufficient convergence to solve the EIT inverse problem, producing equivalent results in a fraction (e.g., $1/100^{th}$) of the time taken by an iterative solve. For example, certain applications which may require rapid refresh, real-time tomography may benefit more from instantaneous inversion than having a few more significant digits of precision in the reconstruction.

3.5.1. Singular Value Decomposition (SVD): One method commonly used for Newton's method iterations is (Truncated) Singular Value Decomposition (T)SVD solving. Singular value decomposition refers to the decomposition of the Jacobian into three (3) unitary matrices of left and right singular vectors (U, V) and a diagonal matrix of singular values (S).

$$J=USV^T. \qquad (31)$$

Here, the number of non-zero singular values in S is equivalent to the rank of the Jacobian. For each singular value, U has a column to represent the contributing linear combination of data-space elements and a column of V stores the corresponding linear combination of model-space elements. The columns of U are the eigenvectors of $JJ^T$, while the columns of V are the eigenvectors of $J^TJ$. In (T)SVD solving, the decomposition in Eq. 31 forms the generalized inverse of J:

$$J^{-g}=VS^{-1}U^T. \qquad (32)$$

The combination of Eqs. 17 and 32 produce the following expression for the inverse solution in the presence of noise:

$$m=VS^{-1}U^T(d+n), \qquad (33)$$

where $(d+n=d^{obs})$ is the observed data that includes noise and m is the best possible reconstruction from the noisy data.

In the case that some singular values in S are metrically or numerically equivalent to zero, truncation may be used to replace the small singular values with zeros. If the small singular values were kept for inverse solving, their reciprocals within $S^{-1}$ may approach infinity and cause widely inaccurate inverse solutions due to noise. Truncation may remedy this by ensuring that noisy information is ignored. To indicate truncation to k singular values, the singular value matrix may be written as $S_k$ for some k<rank (S):

$$S_k = \begin{bmatrix} s_1 & & & & \\ & s_2 & & & \\ & & \ddots & & \\ & & & s_k & \\ & & & & 0 \\ & & & & & \ddots \end{bmatrix} \qquad (34)$$

The truncation point k may be selected with the discrete Picard condition [26] to maintain a solution that is not consumed by noise. This condition may create Picard coefficients from the observed data and the U matrix from singular value decomposition [27]:

$$p=U^T(d+n). \qquad (35)$$

The Picard coefficients may show a decay that decreases upon reaching the noise level n. The discrete Picard condition states that the decay of these Picard coefficients must be faster than the decay observed in the singular values s found in the diagonals of $S_k$. If there exists an index k such that the singular value $s_k$ is decaying faster than the Picard coefficient $p_k$, truncation may become necessary. This (T)SVD solution is a fast and efficient way to form the inverse. In the nonlinear regime, the problem may be iterated with either the same or varying truncation points. In this work, we have written MATLAB code to perform non-iterative (T)SVD solves for our arbitrary polynomial basis function model-spaces.

Not all EIT problems may be solved within the aforementioned linear regime, providing a use case for iterative solving. In practice, the same measurement protocol may be used for each iteration of a nonlinear solve. However, with a sufficiently large library of optimized sensitivity measurement protocols, one may start with the best protocol for the reference guess and switch to an improved protocol based on the results of an initial linear solve. Then, the new protocol may be used in the iterations.

3.5.2. Regularized Inverse

As mentioned in Section 2, the EIT community has developed multiple methods for improving iterative Newton's method solves of the EIT problem, one of which is by use of a regularized inverse. This popular approach, as described by Graham et al. [28], uses the regularized inverse to solve the inverse problem as:

$$m = (J^T W J + \lambda G)^{-1} J^T W (d+n), \tag{36}$$

where G is a regularization matrix determined by the type of regularization used, such as flattening or smoothing, and W is a matrix that models noise. The hyperparameter $\lambda$ controls the extent to which regularization may be applied to the problem.

Either the regularized inverse approach or the (T)SVD approach previously described may be used with optimized sensitivity measurement protocols and reduced dimensionality model-spaces. For the sake of simplifying the examples in the following section, we chose to use our (T)SVD based solver within the linear, single iteration regime.

4. RESULTS AND DISCUSSION

In this section the signal to noise advantage of the sensitivity measurement protocols disclosed herein is illustrated through the application of EIT to phantom models for problems in biomedical imaging and structural engineering. In the first example, a medical imaging scenario shows how the selection of data-space measurements via the sensitivity analysis method results in a factor of 30 times higher noise tolerance compared to the reduced Sheffield protocol. In the language of linear algebra, the sensitivity optimized measurement protocols may lead to a posterior model covariance matrix that has both low variance and low covariance values. In the second example, the same analysis is shown for a structural engineering scenario in which prior knowledge is utilized in the selection of basis functions leading to an even greater factor of 1,000 times increase in noise tolerance compared to reduced Sheffield. The EIDORS EIT package was used to solve the forward problem and plot the reconstructions seen in the following examples. The inverse solves were performed using our own linearized SVD solver as described in section 3.5.1.

4.1. Biomedical Example

One popular proposed biomedical application for EIT technology is chest imaging. For example, measurements of stroke volume and ejection fraction for a heart may diagnose cardiac conditions such as heart failure and coronary syndrome [29] [30] [31] [32]. To simulate this, a circular sample with a homogeneous conductivity serves to model a chest cavity cross section, and a smaller included circle with 20% higher conductivity represents the blood-filled heart. For the sake of this demonstration of methods, other chest cavity features were ignored. In practice, features of varying conductivity, such as the lungs, would be included as an inhomogeneous background reference. The steps of the sensitivity analysis disclosed herein were applied to this scenario. First, the homogeneous circular reference and a desired spatial resolution corresponding to $M_0 = 27$ polynomials were used to form a Zernike basis model-space. For the exactly determined inverse problem, an equivalent data-space dimensionality of $D_0 = 27$ independent measurements may be required. From Eq. 24, this may require at least $C(D_0) = 9$ contacts, chosen to be equally spaced. However, as recommended in Section 3.2. a compliance factor of $c = 3$ is used to determine a better contact number for maximizing sensitivity, namely $C(CD_0) = 27$. Next, a standard EIT forward solver [33] is used to calculate the sensitivity coefficients that make up the sensitivity vectors for each of the $D_{max} = 52{,}650$ possible measurements. Then, the sensitivity optimization algorithm disclosed herein generated an optimal data-space of $D_0$ of these measurements to maximize the sensitivity parallelotope volume. In order to compare with standard EIT methods, a $D_f = 27$ measurement data-space was also formed from the $C(D_f) = 9$ contact reduced Sheffield protocol. Using the parallelotope volume as a basis for comparison, the sensitivity protocol had a 27-dimensional parallelotope volume that was $10^{28}$ times larger than that of the Sheffield protocol, corresponding to an average enhancement of the sensitivity by a factor of 11 times per measurement.

To show the consequences of this enhanced sensitivity in the tomographic inversion, this EIT example was solved with our own linear, (T)SVD solver per Section 3.5. To avoid biased inverse solving, simulated data was generated on a very fine mesh and the Zernike polynomial model-space was used for inversion. Gaussian noise of varying amplitude with standard deviation $\eta$ was added to the simulated data to emulate realistic experimental conditions. After solving noisy data sets for both our protocol and the reduced Sheffield protocol, results were compared to assess the ability of each protocol to differentiate between a "normal heart" and an "enlarged heart".

As a metric for differentiating these two cases, a distinguishability criterion z was determined, inspired by the work of Adler [14]. The distinguishability metric treats the average result of many noisy EIT inverse solves as a vector in model-space $\bar{m}$:

$$\bar{m} = E[m] \tag{37}$$

where $E[\bullet]$ is the ensemble expected value. The variance of all the noisy inversions of a given case form an ellipsoidal surface on model-space described by the covariance matrix $\Sigma$:

$$\Sigma = \begin{bmatrix} \sigma_1^2 & \sigma_{1,2}^2 & \cdots & \sigma_{1,M_0}^2 \\ \sigma_{2,1}^2 & \sigma_2^2 & \cdots & \sigma_{2,M_0}^2 \\ \sigma_{3,1}^2 & \sigma_{3,2}^2 & \ddots & \sigma_{2,M_0}^2 \\ \vdots & \vdots & \vdots & \sigma_{M_0}^2 \end{bmatrix} \tag{38}$$

whereby the variances and covariances are, respectively:

$$\sigma_\beta^2 = E[\|m_\beta - \bar{m}_\beta\|^2] \tag{39}$$

$$\sigma_{\beta\gamma}^2 = E[(m_\beta - \bar{m}_\beta)(m_\gamma - \bar{m}_\gamma)], \tag{40}$$

for $\beta$, $\gamma \in \{1, \ldots M_0\}$. When comparing two distinct ensembles of noisy inversions, in this example a "normal heart" with average model-space vector $\overline{m}_n$ and an "enlarged heart" with average $\overline{m}_1$, one may compute the component of the standard deviations $\Delta m_n$ and $\Delta m_1$ projected along the direction of the difference between the two $\overline{m}_1 - \overline{m}_n$ as follows:

$$\Delta m_{n,i}^2 = \hat{u}^T \Sigma_{n,u} \hat{u}, \tag{41}$$

where the unit vector $\hat{u}$ pointing from $\overline{m}_n$ to $\overline{m}_1$ is $$\hat{u} = \frac{\overline{m}_1 - \overline{m}_n}{\|\overline{m}_1 - \overline{m}_n\|}. \tag{42}$$

Distinguishability z may then be defined as the distance in model space between the two cases relative to the combined standard deviations of the two cases, $$z = \frac{\|\overline{m}_1 - \overline{m}_n\|}{\sqrt{\Delta m_n^2 + \Delta m_1^2}}. \tag{43}$$

For $z \gg 1$, the distinguishability is very high, and the resulting reconstructed images of the two cases are clearly different from each other in spite of the noise. Furthermore, the reconstructed images for each case is indistinguishable by eye from the noiseless reconstruction. However, when the value of z is less than 1, noise has overwhelmed the discernable difference between the two cases, and the patterns are no longer reliably distinguishable, nor do the reconstructed images exactly resemble the noiseless reconstruction.

Figure 12:
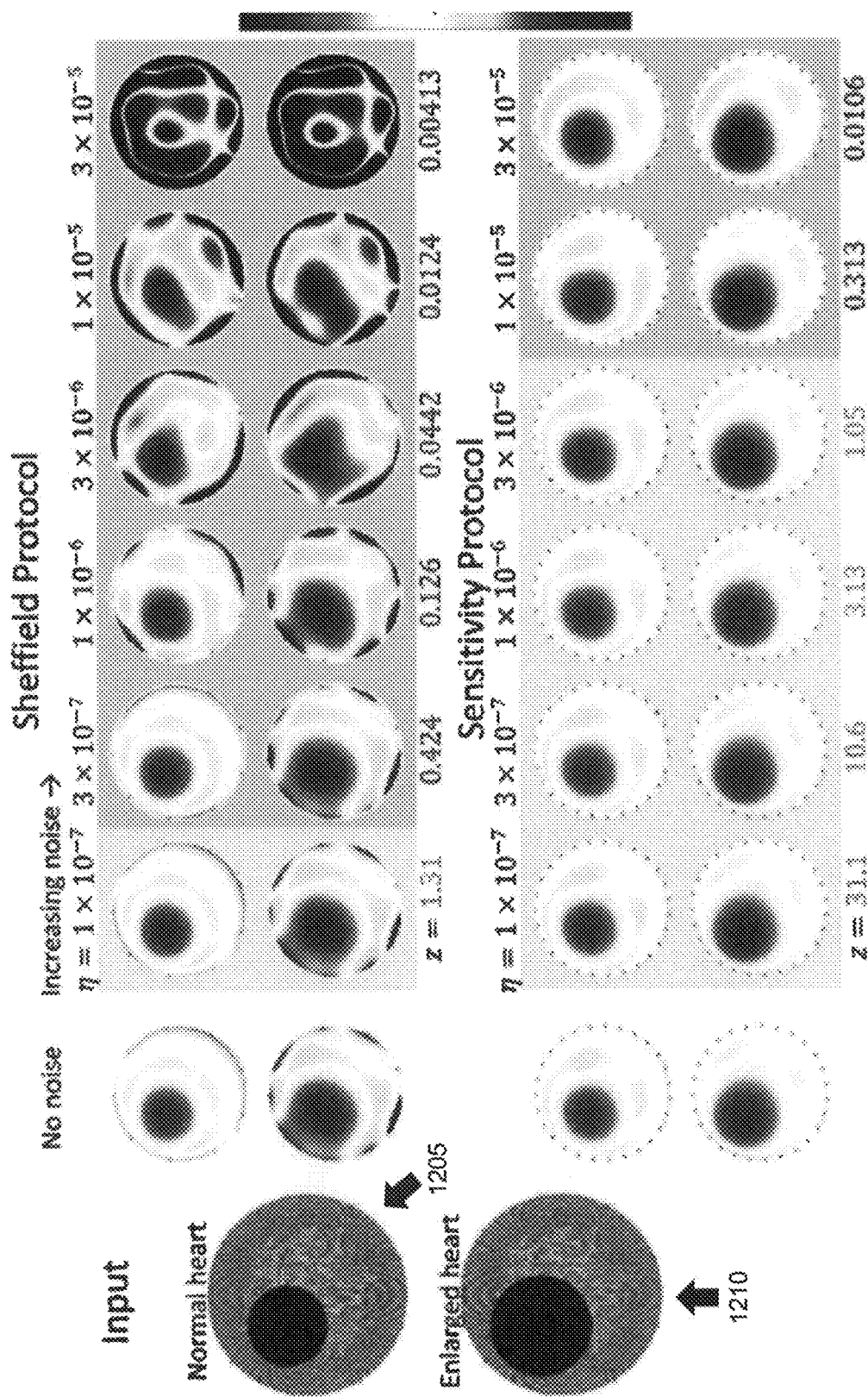
FIG. 12 illustrates an exemplary comparison of reconstruction quality and distinguishability z between a "normal heart" and an "enlarged heart" in an exemplary simplified 2-D model of a chest cavity.

FIG. 12 illustrates an exemplary comparison of reconstruction quality and distinguishability z between a "normal heart" 1205 and "enlarged heart" 1210 in an exemplary simplified 2-D model of a chest cavity. A factor of thirty (30) times larger noise is tolerated by the "Sensitivity protocol" (bottom right) compared to the reduced "Sheffield protocol" (top right). Input resistivity maps and mesh are on left under heading "Input" and reconstructed images without added noise immediately to their right under heading "No noise". Increasing noise level $\eta$ from left to right shows that the reduced Sheffield protocol (top-right rows) faithfully reproduces the noiseless reconstruction only up to a noise level of $\eta = 1 \times 10^{-7}$ (inversions that can be statistically distinguished, where $z > 1$); beyond that, the inversions are indistinguishable or distorted inversions (where $z < 1$). The Sensitivity protocol, on the other hand (bottom-right rows), tolerates a factor of 30 times higher noise level $77 = 3 \times 10^{-6}$. The distinguishability criterion z below each pair of reconstructions highlights reliable reconstructions $z > 1$ from reconstructions whose difference in features between "normal" and "enlarged" is less than the noise variation. The conductivity scale corresponding to the data images is shown on far right.

In FIG. 12, the sensitivity protocol is observed to show a noise tolerance advantage of approximately a factor of thirty (30) times larger noise compared to the standard protocol: from the images and z values, it is clear that the sensitivity protocol may accurately invert with a noise level of up to $\eta = 3 \times 10^{-6}$, whereas the Sheffield protocol may only handle noise up to $\eta = 1 \times 10^{-7}$. For the inverse solves used in this example, the singular values were not truncated during solving. Higher levels of noise may be endured at the loss of information when using truncation. But even under trunca-tion, the observed signal to noise improvement of the sensitivity protocol relative to the Sheffield protocol remains.

4.2. Structural Engineering Example

The second demonstration of the sensitivity analysis method described herein will use a concrete pillar as a structural engineering example. In practice, cylindrical concrete pillars may be reinforced with equally spaced conducting wrought iron reinforcement rods. Maintenance inspections of historical structures or enforcement of building codes may require identifying the amount of reinforcement in a finished structure. To simulate this problem, the cross-section of a concrete pillar is modeled as a homogeneous circular sample with either three (3) or six (6) "rods" at regular intervals within its volume. The model-space for this problem was strategically constructed using the prior knowledge that the solution would have 3-fold rotational symmetry, and selected $M_0 = 27$ polynomial basis functions under that constraint. Of the standard Zernike polynomials, the first $M_0 = 27$ polynomial functions that satisfy the 3-fold symmetry requirement require sampling polynomials up to order $n = 12$. (For example, FIG. 10 depicts up to order $n = 5$, which contains only the first seven of the 3-fold symmetric polynomials.) Following model-space selection, the contact allocation again uses $C(uM_0) = 27$ equally spaced contacts. The next step includes calculation of all $D_{max} = 52,650$ sensitivity vectors for all measurements. For the final step, the data-space was selected from this measurement-space by optimizing the parallelotope volume. Data-space selection used the same algorithm as in the previous example to produce a parallelotope volume with a remarkable $10^{64}$ increase relative to the reduced Sheffield protocol, which breaks down to an average noise tolerance a factor over 200 times greater per measurement for the same number of measurements.

Figure 13:
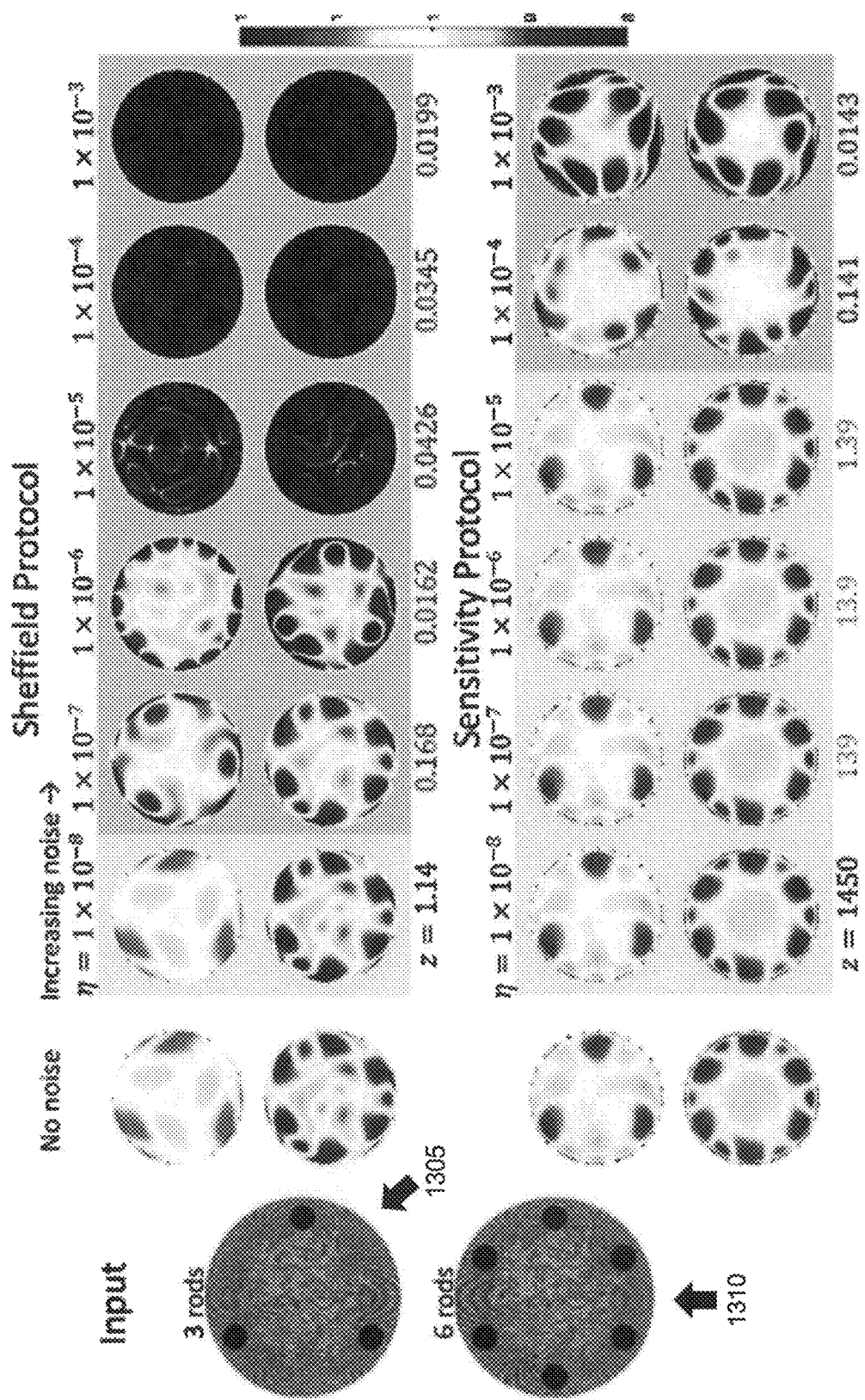
FIG. 13 illustrates an exemplary comparison of reconstruction quality and distinguishability z between three (3) and six (6) reinforcement rods in an exemplary cross-sectional model of a concrete pillar.

FIG. 13 illustrates an exemplary comparison of reconstruction quality and distinguishability z between three (3) and six (6) reinforcement rods in an exemplary cross-sectional model of a concrete pillar. A factor of 1000 times larger noise may be tolerated by the sensitivity protocol described herein compared to the traditional Sheffield protocol. Input resistivity maps and mesh are on left (1305 with three rods, 1310 with six rods) and reconstructed images with no noise immediately to the right under the heading "No noise". Increasing noise level $\eta$ from left to right shows that the reduced "Sheffield Protocol" (top-right rows) faithfully reproduces the noiseless reconstruction only up to $\eta = 1 \times 10^{-8}$ (inversions that may be statistically distinguished have $z > 1$; indistinguishable or distorted inversions have $z < 1$). The "Sensitivity Protocol", on the other hand (bottom-right rows), tolerates a factor of 1,000 times higher noise level $\eta = 1 \times 10^{-5}$. The distinguishability criterion z below each pair of reconstructions highlights reliable reconstructions $z > 1$ from reconstructions whose difference in features between "3 rod" input 1305 and "6 rod" input 1310 is less than the noise variation. Conductivity scale corresponding to the data images is on far right.

Linear (T)SVD is again used to solve the inverse problem. Due to the magnitude of the singular values from the Jacobian matrices for this particular model-space, all inverse solves, both of the sensitivity protocol and the reduced Sheffield protocol, were truncated to 18 singular values. Then, the distinguishability z for various noise levels was calculated to compare the ability to differentiate three (3) and six (6) rods under both protocols. The Gaussian noise with standard deviation $\eta$ was once again simulated for 1000 different trials. The results in FIG. 13 show that the sensitivity protocol described herein may tolerate noise of three (3) orders of magnitude larger than the reduced Sheffield protocol: the reduced Sheffield protocol patterns no longer determine the correct reconstruction and are not distinguishable in the presence of noise $\eta \geq 1 \times 10^{-7}$. In contrast, the sensitivity protocol described herein is acceptable until noise of $\eta = 1 \times 10^{-4}$.

5. CONCLUSIONS

The present disclosure details a sensitivity analysis for optimizing the EIT inverse-problem for noise robust measurements and improved computational speed. The above analysis demonstrates five steps for the careful selection of model-space and data-space elements, leveraging prior information and introducing the sensitivity parallelotope volume figure of merit. The sensitivity analysis procedure chooses a reduced dimensionality model space in which to solve the EIT problem, determines how many contacts can yield the necessary model resolution or features of interest, defines a measurement-space which contains the sensitivity vectors that describe all possible measurements, selects the optimal data-space measurements as a subset of this measurement space, and finally, solves the inverse problem.

With the proposed sensitivity analysis method, the goal of rapid-refresh EIT inversion is brought within reach because of two operating in tandem. First, the choice of a polynomial basis may greatly reduce the dimensionality of the model-space which, in turn, may greatly reduce the computation time of the problem in comparison to the standard regularization problem with a high density of mesh points. Second, the introduction of the sensitivity parallelotope volume may facilitate the optimization of measurement protocols for maximum sensitivity, resulting in significantly improved robustness to noise in comparison to conventional protocols. In the examples presented to illustrate the methods disclosed herein, we observed a factor of up to 1,000 times improvement in noise tolerance compared to standard EIT protocols.

6. REFERENCES

[1] David S Holder. Electrical Impedance Tomography: Methods, History and Applications. Institute of Physics Publishing, 2005.

[2] Camille Gómez-Laberge and Andy Adler. Direct EIT jacobian calculations for conductivity change and electrode movement. Physiological Measurement, 29(6):589-599, June 2008.

[3] Marko Vauhkonen, Jari Kaipio, Erkki Somersalo, and Pasi Karjalainen. Electrical impedance tomography with basis constraints. Inverse Problems, 13:523-530, 041997.

[4] Antti Lipponen, Aku Seppanen, and Jari P. Kaipio. Electrical impedance tomography imaging with reduced-order model based on proper orthogonal decomposition. Journal of Electronic Imaging, 22(2):1-16, 2013.

[5] A. Allers and F. Santosa. Stability and resolution analysis of a linearized problem in electrical impedance tomography. Inverse Problems, 7(4):515-533, August 1991.

[6] Mengxing Tang, Wei Wang, James Wheeler, Malcolm McCormick, and Xiuzhen Dong. The number of electrodes and basis functions in EIT image reconstruction. Physiological Measurement, 23(1):129-140, January 2002.

[7] A. O. Ragheb, L. A. Geddes, J. D. Bourland, and W. A. Tacker. Tetrapolar electrode system for measuring physiological events by impedance. Medical and Biological Engineering and Computing, 30:117-117, January 1992.

[8] L. J van der Pauw. A method of measuring specific resistivity and hall effect of discs of arbitrary shape. Res. Repts, 13:1-9, February 1958.

[9] Yang Zhang, Robert Xiao, and Chris Harrison. Advancing hand gesture recognition with high resolution electrical impedance tomography. Proceedings of the 29th Annual Symposium on User Interface Software and Technology, 2016.

[10] Gang Ma, Zhiliang Hao, Xuan Wu, and Xiaojie Wang. An optimal electrical impedance tomography drive pattern for human-computer interaction applications. IEEE Transactions on Biomedical Circuits and Systems, 14(3): 402-411, 2020.

[11] Christian Putensen, Benjamin Hentze, Stefan Muenster, and Thomas Muders. Electrical impedance tomography for cardio-pulmonary monitoring. Journal of Clinical Medicine, 8(8), 2019.

[12] M. Buttiker. Symmetry of electrical conduction. IBM Journal of Research and Development, 32(3): 317-334, 1988.

[13] B. H. Brown and A. D. Seagar. The sheffield data collection system. *Clinical Physics and* Physiological Measurement, 8(4 A): 91-97, November 1987.

[14] Andy Adler, Pascal Olivier Gaggero, and Yasheng Maimaitijiang. Adjacent stimulation and measurement patterns considered harmful. Physiological Measurement, 32(7):731-744, June 2011.

[15] Andy Adler, John H Arnold, Richard Bayford, Andrea Borsic, Brian Brown, Paul Dixon, Theo J C Faes, Inéz Frerichs, Hervé Gagnon, Yvo Gärber, Bartłomiej Grychtol, Günter Hahn, William R B Lionheart, Anjum Malik, Robert P Patterson, Janet Stocks, Andrew Tizzard, Norbert Weiler, and Gerhard K Wolf. GREIT: a unified approach to 2 d linear EIT reconstruction of lung images. Physiological Measurement, 30(6): S35-S55, June 2009.

[16] B M Graham and A Adler. Electrode placement configurations for 3d EIT. Physiological Measurement, 28(7): 529-544, June 2007.

[17] Mamatjan Yasin, Stephan Böhm, Pascal O Gaggero, and Andy Adler. Evaluation of EIT system performance. Physiological Measurement, 32(7):851-865, June 2011.

[18] Bartłomiej Grychtol, Beat Müller, and Andy Adler. 3d EIT image reconstruction with GREIT. Physiological Measurement, 37(6):785-800, may 2016.

[19] Justin Wagenaar and Andy Adler. Electrical impedance tomography in 3d using two electrode planes: characterization and evaluation. Physiological Measurement, 37(6):922-937, may 2016.

[20] F Thürk, M Elenkov, A D Waldmann, S Böhme, C Braun, A Adler, and E Kaniusas. Influence of reconstruction settings in electrical impedance tomography on figures of merit and physiological parameters. Physiological Measurement, 40(9):094003, September 2019.

[21] Ahmad Karimi, Leila Taghizadeh, and Clemens Heitzinger. Optimal bayesian experimental design for electrical impedance tomography in medical imaging. Computer Methods in Applied Mechanics and Engineering, 373: 113489, 2021.

[22] Danny Smyl and Dong Liu. Optimizing electrode positions in 2-d electrical impedance tomography using deep learning. IEEE Transactions on Instrumentation and Measurement, 69:6030-6044, 082020.

[23] Andy Adler and William R B Lionheart. Uses and abuses of EIDORS: an extensible software base for EIT. Physiological Measurement, 27(5):S25-S42, April 2006.

[24] Bartlomiej Grychtol and Andy Adler. Uniform background assumption produces misleading lung eit images. Physiological Measurement, 34 6:579-93, 2013.
[25] Vasudevan Lakshminarayanan and Andre Fleck. Zernike polynomials: A guide. Journal of Modern Optics—J MOD OPTIC, 58:1678-1678, 042011.
[26] Per Christian Hansen. Truncated singular value decomposition solutions to discrete ill-posed problems with ill-determined numerical rank. SIAM Journal on Scientific and Statistical Computing, 11(3):503-518, 1990.
[27] Panagiotis Kantartzis, Montaserbellah Abdi, and Panos Liatsis. Stimulation and measurement patterns versus prior information for fast 3 d eit: A breast screening case study. Signal Processing, 93(10):2838-2850, 2013. Signal and Image Processing Techniques for Detection of Breast Diseases.
[28] B M Graham and A Adler. Objective selection of hyperparameter for EIT. Physiological Measurement, 27(5):565-579, April 2006.
[29] S Zlochiver, D Freimark, M Arad, A Adunsky, and S Abboud. Parametric EIT for monitoring cardiac stroke volume. Physiological Measurement, 27(5):5139-5146, April 2006.
[30] Martin Proença, Michael Rapin, Fabian Braun, Josep Solà, Mathieu Lemay, and Jean-Philippe Thiran. Cardiac output measured by electrical impedance tomography: Applications and limitations. In 2014 IEEE Biomedical Circuits and Systems Conference (BioCAS) Proceedings, pages 236-239, 2014.
[31] Christian Putensen, Benjamin Hentze, Stefan Muenster, and Thomas Muders. Electrical impedance tomography for cardio-pulmonary monitoring. Journal of Clinical Medicine,
[32] Arun Rao, Yueh-Ching Teng, Chris Schaef, Ethan K. Murphy, Saaid Arshad, Ryan J. Halter, and Kofi Odame. An analog front end asic for cardiac electrical impedance tomography. IEEE Transactions on Biomedical Circuits and Systems, 12(4):729-738, 2018.
[33] M. Vauhkonen, W. R. B. Lionheart, L. M. Heikkinen, P. J. Vauhkonen, and J. P. Kaipio. A MATLAB package for the EIDORS project to reconstruct two-dimensional EIT images. Physiological Measurement, 22(1):107-111, February 2001.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

We claim:

1. A computer implemented method of electrical impedance tomography for preparing a tomographic image to map over a surface of an object, comprising:
defining a surface area of a resistive sensing membrane having Q periphery contact electrodes attached along a periphery of the defined surface area of the resistive sensing membrane, wherein Q comprises an integer higher than or equal to five, wherein a plurality of local area resistances $(r_{ABCD})_i$ to $(r_{ABCD})_N$ that vary with an applied contact pressure over the defined surface area of the resistive sensing membrane cause a two-dimensional (2-D) resistance variation;
mapping a 2-D resistance tomographic image over the defined surface area of the resistive sensing membrane according to the plurality of local area resistances of the applied contact pressure to the defined surface area of the resistive sensing membrane, wherein the 2-D resistance tomographic image mapping comprises:
measuring the plurality of local area resistances $(r_{ABCD})_i$ to $(r_{ABCD})_N$, wherein i=1 to N, and N represents a maximum number of independent tetrapolar measurements;
determining a reference model to reduce computational steps to converge on a final 2-D resistance tomographic image;
identifying a minimal number $M_0$ of model-space basis functions to describe features to be discerned in the 2-D resistance tomographic image;
determining a minimal number of contacts C based on $M_0$;
calculating sensitivity coefficients for a $D_{MAX} \times M_0$ sensitivity matrix;
selecting $D_0$ rows from the sensitivity matrix to form a Jacobian matrix for a linearized forward problem to be solved, where $D_0$ is an intended number of tetrapolar measurements to be performed, $$D_I = \frac{C(C-3)}{2}, \text{ and}$$

$$D_0 < D_I,$$

where $D_I$ is a number of independent measurements given a quantity of C contacts;
determining a $D_0$-dimensional sensitivity parallelotope volume in model-space based on the selected $D_0$ rows from the sensitivity matrix;
solving an inverse problem based on the Jacobian matrix to generate the 2-D resistance tomographic image; and
displaying the 2-D resistance tomographic image.

2. The computer implemented method according to claim 1, wherein determining the reference model comprises selecting a circular domain model-space with orthonormal polynomials as basis functions.

3. The computer implemented method according to claim 1, wherein determining the reference model comprises selecting a circular domain model-space with Zernike polynomial functions $Z_n^k(r, \theta)$ defined over a mesh as a priori conductivity basis functions described by the equations:

$$Z_n^k(r, \theta) = \begin{cases} F_n^k R_n^{|k|} r\cos(k\theta) & \text{for } k \geq 0 \\ -F_n^k R_n^{|k|} r\sin(m\theta) & \text{for } k < 0 \end{cases},$$

$$R_n^{|k|}(r) = \sum_{l=0}^{\frac{n-k}{2}} \frac{(-1)^l (n-l)!}{l! \left(\frac{n+k}{2} - l\right)! \left(\frac{n-k}{2} - l\right)!} r^{n-2l},$$

where the normalization prefactor $F_n^k$ normalizes the integral of the polynomials over the unit circle, $$F_n^k = \sqrt{\frac{2(n+1)}{1+\delta_{k0}}}$$

and contains the Kronecker delta function $\delta_{n0}$, the Zernike polynomials satisfying the orthonormal condition, $$\int_{\theta=0}^{2\pi}\int_{r=0}^{1} Z_n^k Z_{n'}^{k'} dr d\theta = \delta_{n,n'}\delta_{k,k'}.$$

4. The computer implemented method according to claim 3, further comprising representing a conductivity map as a linear combination of Zernike polynomials according to:

$$\sigma(r,\theta) = \sum_{n=0}^{N} \sum_{k=-n,-n+2,\ldots}^{n} m_{n,k} Z_n^k(r,\theta),$$

where N is the highest polynomial order of the Zernike polynomials used, and $m_{n,k}$ is a weight of each corresponding polynomial.

5. The computer implemented method according to claim 4, further comprising representing a dimension $M_{Z(N)}$ of the model-space up to and including the polynomial order N as:

$$M_{Z(N)} = \sum_{j=0}^{N} (j+1) = \frac{(N+1)(N+2)}{2}.$$

6. The computer implemented method according to claim 5, further comprising setting the polynomial order N such that $M_{Z(N)} \geq M_0$, where the $M_0$ polynomials for the model-space basis are chosen to suit the prior knowledge of the symmetry or desired resolution for generating the final 2-D resistance tomographic image.

7. The computer implemented method according to claim 1, wherein the determining a $D_0$-dimensional sensitivity parallelotope volume in model-space further comprises determining the $D_0$-dimensional sensitivity parallelotope volume $V_{D_0}$ based on the Jacobian matrix J as, $$V_{D_0} = \sqrt{\det(JJ^T)}.$$

8. The computer implemented method according to claim 7, further comprising performing a guided greedy search algorithm by adding one measurement at a time, selecting each additional measurement based on a determination that the additional measurement produces the largest $V_{D_0}$ with respect to all prior selected additional measurements.

9. The computer implemented method according to claim 8, further comprising including simulated annealing in the search.

10. The computer implemented method according to claim 8, further comprising including Markov Chain Monte Carlo in the search.

11. The computer implemented method according to claim 1, wherein solving the inverse problem to generate the 2-D resistance tomographic image comprises performing a single iteration of a Newton's method solve.

12. The computer implemented method according to claim 11, wherein performing the Newton's method solve comprises performing (Truncated) Singular Value Decomposition solving by decomposing the Jacobian matrix into three unitary matrices of left and right singular vectors (U, V) and a diagonal matrix of singular values (S), where the Jacobian $J=USV^T$, and the inverse solution in the presence of noise is represented as:

$$m = VS^{-1}U^T(d+n),$$

where $(d+n=d^{obs})$ is the observed data that includes noise and m is the reconstruction from the noisy data.

13. The computer implemented method according to claim 11, wherein performing the Newton's method solve comprises performing a regularized inverse to solve the inverse problem as:

$$m = (J^T W J + \lambda G)^{-1} J^T W(d+n),$$

where G is a regularization matrix determined by a type of regularization used, W is a matrix that models noise, and the hyperparameter $\lambda$ controls the extent to which regularization may be applied.

14. The computer implemented method according to claim 1, wherein the selecting $D_0$ rows from the sensitivity matrix comprises setting the number of independent measurements $D_0$ to match the number of basis functions $M_0$, thereby creating an exactly determined problem and a square Jacobian matrix for inversion of the linear forward problem.

15. The computer implemented method according to claim 1, wherein determining the minimal number of contacts C comprises solving:

$$C(D_0) = \left(\frac{3}{2} + \sqrt{\frac{9}{4} + 2D_0}\right).$$

16. The computer implemented method according to claim 15, wherein the number of contacts C to achieve a compliance condition $D_0 < D_f$ for an exactly determined Jacobian is given as $C(cM_0)$, where c is a compliance factor defined by $D_f = cD_0$.

17. A computer implemented method of electrical impedance tomography for generating a tomographic image based on a 2-D array of electrical resistance measurements over a surface of an object, comprising:
  defining a surface area of a resistive sensing membrane having Q periphery contact electrodes attached along a the defined surface area of the resistive sensing membrane, wherein Q comprises an integer higher than or equal to five, wherein a plurality of local area resistances $(r_{ABCD})_i$ to $(r_{ABCD})_N$ that vary with an applied contact pressure over the defined surface area of the resistive sensing membrane cause a two-dimensional (2-D) resistance variation;
  generating a 2-D resistance tomographic image that is mapped to the defined surface area of the resistive sensing membrane according to the plurality of local area resistances of the applied contact pressure to the defined surface area of the resistive sensing membrane, wherein generating the 2-D resistance tomographic image that is mapped to the defined surface area of the resistive sensing membrane comprises:

measuring the plurality of local area resistances $(r_{ABCD})_i$ to $(r_{ABCD})_N$, wherein i=1 to N, and N represents a maximum number of independent tetra-polar measurements;

selecting a circular domain model-space with orthonormal polynomial functions defined over a mesh as a priori conductivity basis functions, wherein a linear combination thereof represent a conductivity map;

identifying a minimal number $M_0$ of model-space basis functions to describe features to be discerned in the 2-D resistance tomographic image;

determining a minimal number of contacts C based on $M_0$;

calculating sensitivity coefficients for a $D_{MAX} \times M_0$ sensitivity matrix;

selecting $D_0 = M_0$ rows from the sensitivity matrix to form a square Jacobian matrix for a linearized forward problem to be solved, where $D_0$ is an intended number of tetra-polar measurements to be performed, $$D_I = \frac{C(C-3)}{2}, \text{ and}$$

$$D_0 < D_I,$$

where $D_I$ is a number of independent measurements given a quantity of C contacts;

determining a $D_0$-dimensional sensitivity parallelotope volume $V_{D_0}$ in model-space based on the square Jacobian matrix J as, $$V_{D_0} = \sqrt{V\det(JJ^T)};$$

solving an inverse problem based on the square Jacobian matrix J to generate the 2-D resistance tomographic image by performing at least one iteration of a Newton's method solve; and displaying the 2-D resistance tomographic image.

18. The computer implemented method according to claim 17, wherein performing the Newton's method solve comprises performing (Truncated) Singular Value Decomposition solving by decomposing the square Jacobian matrix into three unitary matrices of left and right singular vectors (U, V) and a diagonal matrix of singular values (S), where the Jacobian $J = USV^T$, and the inverse solution in the presence of noise is represented as:

$$m = VS^{-1}U^T(d+n),$$

where $(d+n=d^{obs})$ is the observed data that includes noise and m is the reconstruction from the noisy data.

19. The computer implemented method according to claim 17, wherein performing the Newton's method solve comprises performing a regularized inverse to solve the inverse problem as:

$$m = (J^TWJ + \lambda G)^{-1}J^TW(d+n),$$

where G is a regularization matrix determined by a type of regularization used, W is a matrix that models noise, and the hyperparameter $\lambda$ controls the extent to which regularization may be applied.

20. The computer implemented method according to claim 17, wherein determining the minimal number of number of contacts C is to achieve a compliance condition $D_0 < D_I$ for an exactly determined Jacobian is given as $C(cM_0)$, where c is a compliance factor defined by $D_I = cD_0$.

* * * * *